(12) United States Patent
Nagaoka et al.

(10) Patent No.: US 8,616,931 B2
(45) Date of Patent: Dec. 31, 2013

(54) ELECTRON EMITTING ELEMENT, ELECTRON EMITTING DEVICE, LIGHT EMITTING DEVICE, IMAGE DISPLAY DEVICE, AIR BLOWING DEVICE, COOLING DEVICE, CHARGING DEVICE, IMAGE FORMING APPARATUS, ELECTRON-BEAM CURING DEVICE, AND METHOD FOR PRODUCING ELECTRON EMITTING ELEMENT

(71) Applicants: Ayae Nagaoka, Osaka (JP); Tadashi Iwamatsu, Osaka (JP); Hiroyuki Hirakawa, Osaka (JP); Yasuo Imura, Osaka (JP)

(72) Inventors: Ayae Nagaoka, Osaka (JP); Tadashi Iwamatsu, Osaka (JP); Hiroyuki Hirakawa, Osaka (JP); Yasuo Imura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/835,133

(22) Filed: Mar. 15, 2013

(65) Prior Publication Data

US 2013/0257263 A1    Oct. 3, 2013

Related U.S. Application Data

(62) Division of application No. 12/695,381, filed on Jan. 28, 2010.

(30) Foreign Application Priority Data

Feb. 24, 2009  (JP) .................................. 2009-041150
May 14, 2009  (JP) .................................. 2009-117862
May 14, 2009  (JP) .................................. 2009-117867

(51) Int. Cl.
*H01J 9/00*           (2006.01)

(52) U.S. Cl.
USPC ................................................ 445/49; 445/23

(58) Field of Classification Search
USPC ........................................ 445/23–25, 49–51
See application file for complete search history.

(56) References Cited

U.S. PATENT DOCUMENTS

| 3,644,161 | A | 2/1972 | Hall |
| 4,857,161 | A | 8/1989 | Borel et al. |
| 5,891,548 | A | 4/1999 | Gravier et al. |
| 5,962,959 | A | 10/1999 | Iwasaki et al. |
| 6,023,124 | A | 2/2000 | Chuman et al. |

(Continued)

FOREIGN PATENT DOCUMENTS

| CN | 1755889 A | 4/2006 |
| CN | 1763885 A | 4/2006 |

(Continued)

OTHER PUBLICATIONS

Notice of Allowance issued for U.S. Appl. No. 12/695,381 issued Jun. 14, 2013.

(Continued)

*Primary Examiner* — Joseph L Williams
(74) *Attorney, Agent, or Firm* — Nixon & Vanderhye P.C.

(57) ABSTRACT

An electron emitting element of the present invention includes an electron acceleration layer between an electrode substrate and a thin-film electrode. The electron acceleration layer includes a binder component in which insulating fine particles and conductive fine particles are dispersed. Therefore, the electron emitting element of the present invention is capable of preventing degradation of the electron acceleration layer and can efficiently and steadily emit electrons not only in vacuum but also under the atmospheric pressure. Further, the electron emitting element of the present invention can be formed so as to have an improved mechanical strength.

7 Claims, 9 Drawing Sheets

(56) References Cited

U.S. PATENT DOCUMENTS

| | | | |
|---|---|---|---|
| 6,130,503 A | 10/2000 | Negishi et al. |
| 6,166,487 A | 12/2000 | Negishi et al. |
| 6,462,467 B1 | 10/2002 | Russ |
| 6,626,724 B2 | 9/2003 | Yamamoto et al. |
| 6,628,053 B1 | 9/2003 | Den et al. |
| 6,803,707 B2 | 10/2004 | Ishiwata et al. |
| 6,844,664 B2 | 1/2005 | Komoda et al. |
| 7,723,909 B2 | 5/2010 | Yamaguchi et al. |
| 8,110,971 B2 | 2/2012 | Hirakawa et al. |
| 2001/0017369 A1 | 8/2001 | Iwasaki et al. |
| 2001/0026123 A1 | 10/2001 | Yoneda |
| 2002/0070677 A1 | 6/2002 | Yamada et al. |
| 2002/0136896 A1 | 9/2002 | Takikawa et al. |
| 2003/0076023 A1 | 4/2003 | Komoda et al. |
| 2003/0102793 A1 | 6/2003 | Komoda et al. |
| 2004/0021434 A1 | 2/2004 | Yoneda |
| 2004/0046914 A1 | 3/2004 | Hirota |
| 2004/0150768 A1 | 8/2004 | Shimizu et al. |
| 2004/0197943 A1 | 10/2004 | Izumi et al. |
| 2004/0201345 A1 | 10/2004 | Hirokado |
| 2004/0246408 A1 | 12/2004 | Ando et al. |
| 2005/0181566 A1 | 8/2005 | Machida et al. |
| 2005/0212398 A1 | 9/2005 | Okano et al. |
| 2006/0012278 A1 | 1/2006 | Nanataki et al. |
| 2006/0061967 A1 | 3/2006 | Kim et al. |
| 2006/0065895 A1 | 3/2006 | Kusunoki et al. |
| 2006/0152138 A1 | 7/2006 | Hori et al. |
| 2006/0186786 A1 | 8/2006 | Iwamatsu et al. |
| 2006/0244357 A1 | 11/2006 | Lee |
| 2006/0284543 A1 | 12/2006 | Chung et al. |
| 2006/0290291 A1 | 12/2006 | Aizawa |
| 2006/0291905 A1 | 12/2006 | Hirakawa et al. |
| 2007/0210697 A1 | 9/2007 | Tamura et al. |
| 2007/0222067 A1 | 9/2007 | Nanataki et al. |
| 2009/0091526 A1 | 4/2009 | Hirota |
| 2010/0196050 A1 | 8/2010 | Iwamatsu et al. |
| 2010/0215402 A1 | 8/2010 | Nagaoka et al. |
| 2010/0278561 A1 | 11/2010 | Kanda et al. |
| 2010/0295465 A1 | 11/2010 | Hirakawa et al. |
| 2010/0296842 A1 | 11/2010 | Imura et al. |
| 2010/0296843 A1 | 11/2010 | Hirawaka et al. |
| 2010/0296844 A1 | 11/2010 | Imura et al. |
| 2010/0296845 A1 | 11/2010 | Hirakawa et al. |
| 2010/0307724 A1 | 12/2010 | Ichii et al. |
| 2010/0327730 A1 | 12/2010 | Hirakawa et al. |
| 2011/0129256 A1 | 6/2011 | Hirakawa et al. |

FOREIGN PATENT DOCUMENTS

| | | |
|---|---|---|
| CN | 1849673 | 10/2006 |
| EP | 1 617 449 | 1/2006 |
| EP | 1 617 450 A2 | 1/2006 |
| EP | 1 635 369 | 3/2006 |
| JP | 60-20027 A | 2/1985 |
| JP | 62-172631 | 7/1987 |
| JP | 1-107440 | 4/1989 |
| JP | 1-149335 | 6/1989 |
| JP | 1-279557 | 11/1989 |
| JP | 1-298623 | 12/1989 |
| JP | 6-255168 A | 9/1994 |
| JP | 8-97582 A | 4/1996 |
| JP | 8-250766 A | 9/1996 |
| JP | 9-007499 A | 1/1997 |
| JP | 9-252068 A | 9/1997 |
| JP | 10-066207 A | 3/1998 |
| JP | 10-121042 | 5/1998 |
| JP | 10-308164 | 11/1998 |
| JP | 10-308165 | 11/1998 |
| JP | 10-308166 A | 11/1998 |
| JP | 11-251069 A | 9/1999 |
| JP | 2000-76986 A | 3/2000 |
| JP | 2000-311640 | 11/2000 |
| JP | 2001-68012 A | 3/2001 |
| JP | 2001-195973 A | 7/2001 |
| JP | 2001-357961 | 12/2001 |
| JP | 2002-93310 A | 3/2002 |
| JP | 2002-208346 A | 7/2002 |
| JP | 2002-279892 A | 9/2002 |
| JP | 2003-115385 | 4/2003 |
| JP | 2003-173744 A | 6/2003 |
| JP | 2003-173878 A | 6/2003 |
| JP | 2003-331712 | 11/2003 |
| JP | 2004-241161 | 8/2004 |
| JP | 2004-253201 A | 9/2004 |
| JP | 2004-296781 | 10/2004 |
| JP | 2004-296950 | 10/2004 |
| JP | 2004-327084 A | 11/2004 |
| JP | 2005-5205 A | 1/2005 |
| JP | 2005-106903 A | 4/2005 |
| JP | 2005-190878 A | 7/2005 |
| JP | 2005-209396 A | 8/2005 |
| JP | 2005268025 A | 9/2005 |
| JP | 2005-326080 A | 11/2005 |
| JP | 2005-328041 | 11/2005 |
| JP | 2006-054162 | 2/2006 |
| JP | 2006-100758 | 4/2006 |
| JP | 2006-190545 A | 7/2006 |
| JP | 2006-236964 | 9/2006 |
| JP | 2006-351524 A | 12/2006 |
| JP | 2007-290873 | 11/2007 |
| JP | 2009-019084 A | 1/2009 |
| JP | 2009092902 A | 4/2009 |
| JP | 2009-146891 A | 7/2009 |
| JP | 4314307 B1 | 8/2009 |
| JP | 2010-267492 A | 11/2010 |
| TW | 200638455 | 7/1994 |
| TW | I237722 | 8/2005 |
| TW | I257117 | 6/2006 |
| TW | I278696 | 4/2007 |
| TW | I287241 | 9/2007 |
| WO | 98/27568 | 6/1998 |
| WO | 2005/004545 A1 | 1/2005 |
| WO | 2009/066723 | 5/2009 |

OTHER PUBLICATIONS

Office Action mailed Mar. 14, 2013 in U.S. Appl. No. 12/696,905.
Notice of Allowance mailed Mar. 11, 2013 in U.S. Appl. No. 12/698,342.
Notice of Allowance mailed Dec. 5, 2012 in U.S. Appl. No. 12/743,741.
Notice of Allowance mailed Oct. 10, 2012 in U.S. Appl. No. 12/698,435.
Office Action mailed Jan. 17, 2013 in U.S. Appl. No. 12/695,381.
U.S. Office Action issued in co-pending U.S. Appl. No. 12/696,905, dated Sep. 28, 2012.
Office Action mailed Nov. 27, 2012 in U.S. Appl. No. 12/698,342.
U.S. Office Action mailed Jun. 18, 2012 in U.S. Appl. No. 12/698,435.
U.S. Office Action mailed Jun. 22, 2012 in U.S. Appl. No. 12/743,741.
U.S. Office Action mailed Jul. 19, 2012 in U.S. Appl. No. 12/698,342.
Office Action mailed May 17, 2012 in U.S. Appl. No. 12/698,435.
Restriction Requirement mailed Apr. 16, 2012 in U.S. Appl. No. 12/699,349.
Notice of Allowance mailed Apr. 17, 2012 in U.S. Appl. No. 12/781,997.
Notice of Allowance mailed Dec. 29, 2011 in U.S. Appl. No. 12/782,102.
Office Action mailed Nov. 29, 2011 in U.S. Appl. No. 12/698,435.
Office Action mailed Dec. 16, 2011 in U.S. Appl. No. 12/698,435.
Notice of Allowance mailed Nov. 29, 2011 in U.S. Appl. No. 12/782,102.
U.S. Appl. No. 12/940,546, filed Nov. 5, 2010, entitled "Heat Exchanger".
English version of ISR for PCT/JP2009/052904 mailed Apr. 21, 2009.
ISR for PCT/JP2008/071102, mailed Feb. 24, 2009.
Electrophotography-Bases and Applications (1998; p. 213), The Society of Electrophotography of Japan, Corona Publishing Co., Ltd. (with partial English translation).

(56) References Cited

OTHER PUBLICATIONS

Ionic winds for locally enhanced cooling, David B. Go, Suresh V. Garimella, and Timothy S. Fisher, J. Appl. Phys., 102, (2007).

Naoi et al., "TiO2 Films Loaded with Silver Nanoparticles: Control of Multicolor Photochromic Behavior" J. Am. Chem. Soc., vol. 126, No. 11, p. 3664-3668 (2004).

Yamaguchi et al., "Development of Highly Efficient Electron-Beam Source by Use of Carbon Nanotube for Image Recording", Collected Papers of Japan Hardcopy 97, The Imaging Society of Japan, p. 221-224, Jul. 1997 (with partial English translation).

U.S. Appl. No. 12/956,136, filed Nov. 30, 2010, entitled "Electron Emitting Element, Method for Producing Electron Emitting Element, Electron Emitting Device, Charging Device, Image Forming Apparatus, Electron-Beam Curing Device, Image Display Device, Air Blowing Device, Cooling Device" (not yet published), Hiroyuki Hirakawa.

U.S. Appl. No. 12/781,997, filed May 18, 2010, entitled "Light Emitting Element, Electron Emitting Device, Charging Device, Image Forming Apparatus, Electron-Beam Curing Device, Light Emitting Device, Image Display Device, Air Blowing Device, and Cooling Device".

U.S. Appl. No. 12/782,024, filed May 18, 2010, entitled "Light Emitting Element, Light Emitting Device, Image Display Device, Method of Driving Light Emitting Element, and Method of Producing Light Emitting Element".

U.S. Appl. No. 12/782,102, filed May 18, 2010, entitled "Electron Emitting Element, Electron Emitting Device, Light Emitting Device, Image Display Device, Air Blowing Device, Cooling Device, Charging Device, Image Forming Apparatus, and Electron-Beam Curing Device".

U.S. Appl. No. 12/743,741, filed May 18, 2010, entitled "Electron Emitting Element, Electron Emitting Device, Light Emitting Device, Image Display Device, Air Blowing Device, and Cooling Device, Charging Device, Image Forming Apparatus, Electron-Beam Curing Device, and Method for Producing Electron Emitting Element ".

U.S. Appl. No. 12/696,905, filed Jan. 29, 2010, entitled "Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element".

U.S. Appl. No. 12/698,342, filed Feb. 2, 2010, entitled "Electron Emitting Element, Electron Emitting Device, Light Emitting Device, Air Blowing Device, Charging Device, Electron-Beam Curing Device, and Method for Producing Electron Emitting Element".

U.S. Appl. No. 12/698,435, filed Feb. 2, 2010, entitled "Electron Emitting Element and Method for Producing Electron Emitting Element".

U.S. Appl. No. 12/699,349, filed Feb. 3, 2010, entitled "Electron Emitting Element, Electron Emitting Device, Light Emitting Device, Image Display Device, Cooling Device, and Charging Device".

Office Action issued in U.S. Appl. No. 12/695,381, issued Jan. 17, 2013.

ELECTRON EMITTING ELEMENT, ELECTRON EMITTING DEVICE, LIGHT EMITTING DEVICE, IMAGE DISPLAY DEVICE, AIR BLOWING DEVICE, COOLING DEVICE, CHARGING DEVICE, IMAGE FORMING APPARATUS, ELECTRON-BEAM CURING DEVICE, AND METHOD FOR PRODUCING ELECTRON EMITTING ELEMENT

The present application is a divisional of U.S. patent application Ser. No. 12/695,381, filed Jan. 28, 2010, which claims the benefit of Japanese Patent Application Nos. 2009-041150; 2009-117862, and 2009-117867 filed on Feb. 24, 2009, May 14, 2009, and May 14, 2009, the entire content of each of which are incorporated herein by reference.

TECHNICAL FIELD

The present invention relates to an electron emitting element and the like for emitting electrons by application of a voltage.

BACKGROUND ART

A Spindt-type electrode and a carbon nanotube electrode (CNT) have been known as conventional electron emitting elements. Applications of such conventional electron emitting elements to, for example, the field of Field Emission Display (FED) have been studied. Such electron emitting elements are caused to emit electrons by tunnel effect resulting from formation of an intense electric field of approximately 1 GV/m that is produced by application of a voltage to a pointed section.

However, each of these two types of the electron emitting elements has an intense electric field in the vicinity of a surface of an electron emitting section. Accordingly, electrons emitted obtain a large amount of energy due to the electric field. This makes it easy to ionize gas molecules. However, cations generated in the ionization of the gas molecules are accelerated in a direction of a surface of the element due to the intense electric field and collide with the surface. This causes a problem of breakdown of the element due to sputtering. Further, ozone is generated before ions are generated, because oxygen in the atmosphere has dissociation energy that is lower than ionization energy. Ozone is harmful to human bodies, and oxidizes various substances because of its strong oxidizing power. This causes a problem in that members around the element are damaged. In order to prevent this problem, the members used around the electron emitting element are limited to members that have high resistance to ozone.

In order to solve this problem, an MIM (Metal Insulator Metal) type and an MIS (Metal Insulator Semiconductor) type have been known as other types of electron emitting elements. These electron emitting elements are surface-emission-type electron emitting elements which accelerate electrons by utilizing quantum size effect and an intense electric field in the element so that electrons are emitted from a flat surface of the element. These electron emitting elements do not require an intense electric field outside the elements, because the electrons which are accelerated in respective electron acceleration layers inside the elements are emitted to the outside. Therefore, each of the MIM type and the MIS type electron emitting elements can overcome the problems such that (i) the element is broken down by the sputtering which occurs due to ionization of gas molecules and (ii) ozone is generated, in the Spindt-type, CNT type, and BN type electron emitting elements.

For increasing mechanical strength of such electron emitting elements, for example, Patent Literature 1 discloses, as an electron acceleration layer, an electron emitting section and an insulating film configured by a powder layer made of a plurality of insulating material particles and an oxide insulator coating this powder layer. This insulating film is used as a spacer in a predetermined region on an electrode substrate. In the electron emitting element of Patent Literature 1, it is required to control film thicknesses of the electron acceleration layer and a thin-film electrode on the electron acceleration layer and to maintain mechanical strength.

Further, for example, Patent Literature 2 discloses an electron emitting element including, as an electron acceleration layer, a relatively thick insulating film containing metal or semiconductor fine particles. Regarding the electron emitting element of Patent Literature 2, it is reported that: because the fine particles are dispersed in the insulating film, a voltage of 10 V or more can be applied to the electron emitting element; dielectric breakdown of the insulating film becomes difficult to occur; and a process yield and reproducibility are improved.

CITATION LIST

Patent Literature 1
Japanese Patent Application Publication, Tokukai, No. 2000-311640 (Publication Date: Nov. 7, 2000)
Patent Literature 2
Japanese Patent Application Publication, Tokukaihei, No. 1-298623 (Publication Date: Dec. 1, 1989)

SUMMARY OF INVENTION

Technical Problem

However, in cases where each of the above conventional electron emitting elements of the MIM type and the MIS type is operated in the atmosphere, various gas molecules adhere to a surface of the element. This changes an electric property of an electric acceleration layer and reduces an electron emission current, which is a new problem.

In each of the conventional electron emitting elements of the MIM type and the MIS type in which electrons are accelerated in the electron acceleration layer, a surface of each of the electron emitting element serves as an upper electrode (a thin-film electrode) for applying an electric field to the electron acceleration layer. This surface is generally made of a thin metal film. Further, the surface of each of the conventional electron emitting elements of the MIM type and the MIS type also has a function to emit electrons, which are accelerated in the electron acceleration layer, in vacuum by allowing the electrons to tunnel the thin metal film. The thinner the thin metal film is, the greater the possibility of tunneling of the electrons accelerated in the electron acceleration layer becomes and the greater the amount of electrons emitted becomes. Accordingly, a thinner metal film is preferable. However, if the thin metal film is too thin, a barrier effect against gas molecules is barely provided because it becomes difficult to form a dense film. Therefore, when such an electron emitting element is operated in the atmosphere, gas molecules come into the electron acceleration layer and changes an electric property of the electron acceleration layer. This causes a problem such that electron emission current decreases.

As a result, the electron emitting element cannot steadily generate electrons in the atmosphere. In particular, when the electron acceleration layer includes conductive fine particles, oxidation of the conductive fine particles proceeds due to oxygen in the atmosphere. This degrades the electron acceleration layer and stops electron emission.

Further, when the electron acceleration layer includes fine particles and an aggregate of the fine particles is produced due to poor dispersibility, performance of the electron emitting element does not become uniform. Consequently, electrons cannot be supplied steadily. Moreover, when the electron acceleration layer includes insulating particles as described in Patent Literature 1, a surface of the electron acceleration layer becomes uneven and coarse. As a result, it becomes difficult to make the thin metal film thin when the thin metal film is formed on the electron acceleration layer. As described above, it is more preferable to make the thin metal film thinner. However, in a case where the thin metal film cannot be formed thinly, the electrons cannot be efficiently emitted.

In the electron emitting layer of Patent Literature 1, an insulating film and an electron emitting section are separately configured and the insulating film is used as a spacer. This produces a gap between the electron emitting section and an electrode, so that electrons cannot be efficiently emitted. Further, in the electron emitting element of Patent Literature 2, a relatively thick insulating film includes metal or semiconductor fine particles. Accordingly, shortage of the metal or semiconductor fine particles present in the vicinity of an electrode occurs and discharge current disappears. Consequently, electrons cannot be efficiently emitted. In other words, the electron emitting elements of the MIM type and the MIS type cannot emit electrons efficiently.

For improving the electron emission efficiency, to reduce the thickness of the electron acceleration layer can be considered as one possibility. However, when the thickness of the electron acceleration layer is reduced, uniformity and/or mechanical strength of the electron acceleration layer may deteriorate.

The present invention is attained in view of the above problems. An object of the present invention is to provide an electron emitting element or the like (i) that is capable of preventing degradation of the electron acceleration layer and efficiently and steadily emitting electrons not only in vacuum but also under an atmospheric pressure; and (ii) that has a high mechanical strength. Another object of the present invention is to improve electron emission efficiency of the electron emitting element and prevent degradation of the electron acceleration layer.

In the electron emitting element of Patent Literature 2, the insulating film is formed by (i) dispersing the fine particles in an insulating coating solution and (ii) baking an electrode substrate on which the solution is applied. Therefore, time, cost, equipment and the like for the baking become necessary. Further, the fine particles dispersed in the insulating film has an average particle diameter of $1000 \times 10^{-10}$ m or less. Though a melting point of the fine particles depends on a material forming the fine particles, the fine particles having a smaller particle diameter dissolve faster. Therefore, in the electron emitting element of Patent Literature 2, before the insulating film is formed by the baking process, the fine particles may have dissolved and caused aggregation or segregation. As a result, an expected result may not be obtained.

Further, in the electron emitting element of Patent Literature 2, an insulating coating solution in which conductive fine particles are dispersed is applied. However, when this application is carried out by spin coating or dipping, it becomes difficult to control a position or an amount of an electron emitting section or to form a thin film.

Therefore, it is necessary to omit the baking process and provide the fine particles so that a small amount of the fine particles are present evenly in the electron emitting element.

The present invention is attained in view of the above problems. A still another object of the present invention is to provide a method for producing an electron emitting element capable of steadily and sufficiently emitting electrons which method makes it possible to provide a small amount of conductive fine particles evenly in a desired position easily at low cost, the electron emitting element, and the like.

Solution to Problem

In order to solve the problems described above, an electron emitting element of the present invention includes: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including a binder component in which an insulating material and conductive fine particles are dispersed.

In order to solve the problems described above, a method of the present invention for producing an electron emitting element that includes: an electrode substrate; a thin-film electrode; and an electron acceleration layer including conductive fine particles and insulating fine particles, the electron acceleration layer being sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the method comprising the step of forming the electron acceleration layer, the step including the sub-steps of: forming, on the electrode substrate, a fine particle layer by applying an insulating fine particle dispersion solution in which the insulating fine particles are dispersed in a dispersion solvent, the fine particle layer including the insulating fine particles; and applying, on the fine particle layer, a conductive fine particle dispersion solution by an ink-jet method, in which conductive fine particle dispersion solution the conductive fine particles are dispersed in a dispersion solvent.

Advantageous Effects of Invention

As described above, in the electron emitting element of the present invention, the electron acceleration layer includes a binder component in which the insulating material and the conductive fine particles are dispersed.

According to the arrangement, there is provided, between the electrode substrate and the thin-film electrode, the electron acceleration layer including the binder component. In the binder component, the insulating material and the conductive fine particles are dispersed. This electron acceleration layer is a thin-film layer in which the insulating material and the conductive fine particles are dispersed in the binder component, and the electron acceleration layer has a semiconductive property. When a voltage is applied to the semiconductive electron acceleration layer, current flow occurs in the electron acceleration layer. A part of electrons in the current become ballistic electrons due to an intense electric field produced by the applied voltage and the ballistic electrons are emitted. The conductive fine particles are dispersed in the binder component, that is, the binder component is present around the conductive fine particles. This makes element degradation due to oxidation caused by oxygen in the atmosphere difficult to occur. Therefore, the electron emitting element can be steadily operated not only in vacuum but also under the atmospheric pressure.

Further, because the insulating material and the conductive fine particles are dispersed in the binder component, aggregation is difficult to occur. Accordingly, performance of the electron emitting element becomes uniform, and steady electron supply becomes possible. Furthermore, the binder component has a high adhesiveness with respect to the electrode substrate and a high mechanical strength. In addition, the binder component improves smoothness of a surface of the electron acceleration layer, so that the thin-film electrode on the electron acceleration layer can be formed thinly. Therefore, the electron emitting element of the present invention can have a thin electron acceleration layer in which the insulating material and the conductive fine particles are substantially evenly dispersed. As a result, the electron emitting element of the present invention has uniform performance and a high mechanical strength.

In this way, the electron emitting element of the present invention can prevent degradation of the electron emitting layer and can efficiently and steadily emit electrons not only in vacuum but also under the atmospheric pressure. Further, the electron emitting element of the present invention can have a higher mechanical strength.

As described above, the electron emitting element of the present invention includes a binder component in which conductive fine particles and insulating fine particles that have an average particle diameter greater than an average particle diameter of the conductive fine particles are dispersed. Further, the conductive fine particles are dispersed in large numbers on a side of the thin-film electrode in the electron acceleration layer.

According to the arrangement, there is provided, between the electrode substrate and the thin-film electrode, the electron acceleration layer including the binder component. In the binder component, the insulating fine particles and the conductive fine particles are dispersed. This electron acceleration layer is a thin-film layer in which the insulating fine particles and the conductive fine particles are dispersed in the binder component, and the electron acceleration layer has a semiconductive property. When a voltage is applied to the semiconductive electron acceleration layer, current flow occurs in the electron acceleration layer. A part of electrons in the current become ballistic electrons due to an intense electric field produced by the applied voltage and the ballistic electrons are emitted.

In the electron acceleration layer, because the conductive fine particles are provided in large numbers on a side of the thin-film electrode, an electric field becomes more intense in the vicinity of the thin-film electrode and electron emission efficiency becomes high. Moreover, the conductive fine particles are dispersed in the binder component, that is, the binder component is present around the conductive fine particles. This makes element degradation due to oxidation caused by oxygen in the atmosphere difficult to occur. Therefore, the electron emitting element can be steadily operated not only in vacuum but also under the atmospheric pressure. Further, because the insulating fine particles and the conductive fine particles are dispersed in the binder component, aggregation is difficult to occur. Accordingly, performance of the electron emitting element becomes uniform, and steady electron supply becomes possible. Furthermore, the binder component has a high adhesiveness with respect to the electrode substrate and a high mechanical strength. In addition, the binder component improves smoothness of a surface of the electron acceleration layer, so that the thin-film electrode on the electron acceleration layer can be formed thinly.

In this way, according to the electron emitting element of the present invention, electrons can be emitted at a high efficiency. Further, because degradation of the electron acceleration layer can be prevented, electrons can be efficiently and steadily emitted not only in vacuum but also under the atmospheric pressure. In addition, according to the electron emitting element of the present invention, a mechanical strength can be improved.

As described above, a method of the present invention for producing an electron emitting element includes the step of forming the electron acceleration layer, the step including the sub-steps of: forming, on the electrode substrate, a fine particle layer by applying an insulating fine particle dispersion solution in which the insulating fine particles are dispersed in a dispersion solvent, the fine particle layer including the insulating fine particles; and applying, on the fine particle layer, a conductive fine particle dispersion solution by an ink-jet method, in which conductive fine particle dispersion solution the conductive fine particles are dispersed in a dispersion solvent.

According to the method, the electron acceleration layer should have a semiconductive property that allows electrons to become ballistic electrons in the electron acceleration layer and be emitted. However, the amount of the electrons emitted from the electron emitting element does not need to increase in proportion to an amount of the conductive fine particles in the electron acceleration layer. Therefore, an amount of the conductive fine particles necessary in the electron acceleration layer is small. Meanwhile, for obtaining an element having uniform performance, the electron emitting section that is a region into which the conductive fine particles are introduced should not be distributed unevenly. Accordingly, for producing the element, it is required (i) to select a dispersion solvent having a suitable dispersibility for each fine particle, (ii) to apply evenly a small amount of the conductive fine particle dispersion solution on the fine particle layer including the insulating fine particles, and (iii) to distribute evenly the conductive fine particles in a region into which the conductive fine particles are introduced above, or inside, or above and inside the fine particle layer. Further, for performing patterning of the electron acceleration section, it is necessary to control whether or not the conductive fine particles are present on the fine particle layer.

In the above production method, in the step of forming the electron acceleration layer, the fine particle layer including the insulating fine particles are formed and the conductive fine particle dispersion solution is applied by using the ink-jet method onto the fine particle layer. According to this method, a small amount of the conductive fine particles can be evenly provided in a desired area in the region into which the conductive fine particles are introduced above, or inside, or above and inside the fine particle layer. This makes it possible to produce the electron emitting element in which the electron emitting section is evenly provided and which is capable of steadily and sufficiently emitting electrons.

Further, according to the method, the insulating fine particle dispersion solution and the conductive fine particle dispersion solution are prepared separately, and individually applied on the electrode substrate. This prevents the occurrence of aggregation at the time when the insulating fine particle dispersion solution and the conductive fine particle dispersion solution are mixed.

Accordingly, because the conductive fine particle dispersion solution is applied after the fine particle layer is formed by applying the insulating fine particle dispersion solution on the electrode substrate, the electron acceleration layer that has less aggregates of the fine particles and controlled conductivity can be formed. Moreover, by an easy production process in which the dispersion solution of the fine particles is applied, the electron emitting element can be obtained simply at low cost.

In this way, according to the method of the present invention, the aggregate of the fine particles can be prevented from occurring. Further, it becomes possible to produce the electron emitting element whose electron acceleration layer can be formed simply at low cost so that the electron emitting section is evenly provided in the region where the conductive fine particles are introduced above, or inside, or above and inside the fine particle layer including the evenly dispersed insulating fine particles. This electron emitting element also can emit a steady and sufficient amount of electrons. Furthermore, when the conductive fine particles are applied to the fine particle layer, the ink-jet method is used according to the above method. Therefore, a discharge amount and a discharge position of the conductive fine particles can be controlled. When the discharge position of the conductive fine particles is controlled, the electron emitting section that emits a steady and sufficient amount of electrons can be freely patterned in the electron acceleration layer by using a small amount of material.

DESCRIPTION OF EMBODIMENTS

The following specifically explains Embodiments and Examples of an electron emitting element of the present invention, with reference to FIGS. 1 to 13. Note that Embodiments and Examples described below are merely specific examples of the present invention and by no means limit the present invention.

Embodiment 1

Figure 1:
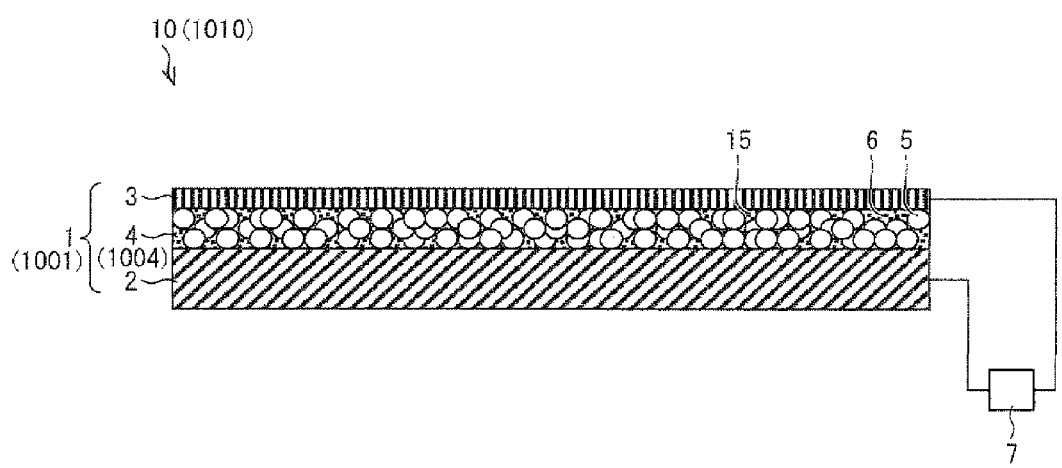
FIG. 1 is a schematic view illustrating a configuration of an electron emitting device including an electron emitting element according to Embodiment 1 or Embodiment 2 of the present invention.

FIG. 1 is a schematic view illustrating an embodiment of an electron emitting device including an electron emitting element of the present invention. As illustrated in FIG. 1, an electron emitting element 1 of the present embodiment includes an electrode substrate 2 serving as a lower electrode, a thin-film electrode 3 serving as an upper electrode, and an electron acceleration layer 4 sandwiched between the electrode substrate 2 and the thin-film electrode 3. Further, the electrode substrate 2 and the thin-film electrode 3 are connected to a power supply 7, so that a voltage can be applied between the electrode substrate 2 and the thin-film electrode 3 which are provided so as to face each other. The electron emitting element 1 applies a voltage between the electrode substrate 2 and the thin-film electrode 3 so that current flows between the electrode substrate 2 and the thin film electrode 3, that is, in the electron acceleration layer 4. A part of electrons in the current are caused to transmit through the thin-film electrode 3 and/or be emitted through gaps in the thin-film electrode 3 as ballistic electrons due to an intense electric field formed by the applied voltage. The electron emitting element 1 and the power supply 7 constitute an electron emitting device 10.

The electrode substrate 2 serving as the lower electrode also acts as a supporting member of the electron emitting element. Accordingly, the electrode substrate 2 is not specifically limited in material as long as the material has a sufficient strength, excellent adhesiveness with respect to a substance in direct contact with the material and sufficient electrical conductivity. Examples of the electrode substrate include: metal substrates made of, for example, SUS, Ti, and Cu; semiconductor substrates made of, for example, Si, Ge, and GaAs; insulator substrates such as a glass substrate; and plastic substrates. In cases where an insulator substrate such as a glass substrate is used, an electrically conductive material such as metal is attached, as an electrode, to an interface of the insulator substrate and the electron acceleration layer 4 so that the insulator substrate can be used as the electrode substrate 2 that serves as the lower electrode. A constituent material of the electrically conductive material is not specifically limited as long as a thin film of a material excellent in electric conductivity can be formed by magnetron sputtering or the like. Note that, if a steady operation of the electron emitting element in the atmosphere is desired, a conductor having a high resistance to oxidation is preferably used and noble metal is more preferably used for the constituent material. An ITO thin-film which is widely used as an electrically conductive oxide material for a transparent electrode is also applicable. Alternatively, it is possible to use, as the lower electrode, a metal thin film obtained by first forming a Ti film of 200 nm on a surface of a glass substrate and then forming a Cu film of 1000 nm on the Ti film, because a strong thin film can be formed. In this case, materials and values are not specifically limited to those described above.

The thin-film electrode 3 is for applying a voltage in the electron acceleration layer 4. Accordingly, a material of the thin-film electrode 3 is not specifically limited as long as the material makes it possible to apply a voltage. A material which has a low work function and from which a thin-film can be formed is expected to provide a greater effect, in view of emitting, with a minimum energy loss, electrons which have high energy due to acceleration within the electron acceleration layer 4. Examples of such a material include: gold, silver, carbon, tungsten, titanium, aluminum, and palladium each of which has a work function in a range of 4 eV to 5 eV. Among these materials, in particular, in consideration of an operation under an atmospheric pressure, the best material is gold which is free from oxide or sulfide formation reaction. Further, silver, palladium, or tungsten each of which has a relatively small oxide formation reaction is also applicable material that can be used without any problem.

Further, a film thickness of the thin-film electrode 3 is a very important factor for causing efficient emission of electrons from the electron emitting element 1 to the outside. The thin-film electrode 3 preferably has a film thickness in a range of 10 nm to 55 nm. The minimum film thickness of the thin-film electrode 3 is 10 nm, for causing the thin-film electrode 3 to work properly as a planar electrode. A film thickness of less than 10 nm cannot ensure electrical conduction. On the other hand, the maximum film thickness of the thin-film electrode 3 is 55 nm, for emitting electrons from the electron emitting element 1 to the outside. In a case where the film thickness is more than 55 nm, ballistic electrons do not pass thorough the thin-film electrode 3. In such a case, the ballistic electrons are absorbed by the thin-film electrode 3, or the ballistic electrons are reflected back by the thin-film electrode 3 and recaptured in the electron acceleration layer 4.

Figure 2:
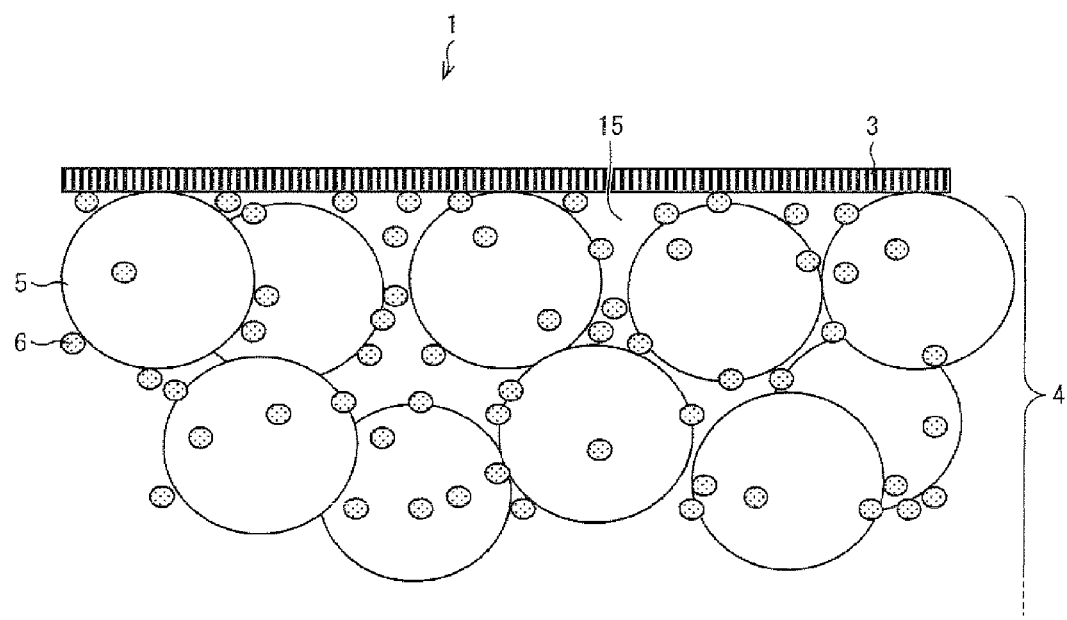
FIG. 2 is an enlarged view of the vicinity of an electron acceleration layer in the electron emitting element of Embodiment 1 of the present invention.

As shown in FIG. 2, the electron acceleration layer 4 may include a binder component 15 in which an insulating material 5 and conductive fine particles 6 are dispersed. In the present embodiment, the electron acceleration layer 4 includes the binder component 15 in which the conductive fine particles 6 and insulating fine particles 5 as the insulating material 5 are dispersed.

The insulating fine particles 5 preferably have a diameter larger than that of the conductive fine particles 6 so that the insulating fine particles 5 has a heat dissipation effect superior to that of the conductive fine particles 6. The diameter (average particle diameter) of the insulating fine particles 5 is preferably in a range of 10 nm to 1000 nm, and more preferably in a range of 12 nm to 110 nm. In such a case, diameters of the fine particles may be broadly distributed with respect to the average particle diameter. For example, insulating fine particles having an average particle diameter of 50 nm may have particle diameter distribution in a range of 20 nm to 100 nm.

A material of the insulating fine particles 5 is not specifically limited as long as the material has an insulating property. For example, $SiO_2$, $Al_2O_3$, and $TiO_2$ are practically used. However, in a case where surface-treated silica particles having a small particle diameter are used, a surface area of the surface-treated silica particles is increased in a dispersion solution (solution) and viscosity of the dispersion solution (solution viscosity) increases as compared to a case where spherical silica particles having a particle diameter larger than that of the surface-treated silica particles are used. As a result, a thickness of the electron acceleration layer 4 tends to increase slightly. Further, fine particles made of an organic polymer can be used as the material of the insulating fine particles 5. Examples of such fine particles that can be used are cross-linked fine particles (SX 8743) made of stylene/divinylbenzene manufactured and marketed by JSR Corporation, or Fine Sphere series which are styrene acryl fine particles manufactured and marketed by NIPPON PAINT Co., Ltd.

In the present embodiment, particles that may be used as the insulating fine particles 5 include (i) two or more different kinds of particles, (ii) particles having different peaks in diameter, or (iii) one kind of particles whose distribution of diameters is broad.

The conductive fine particles 6 can be made of any kind of conductor, in view of an operation principle for generating ballistic electrons. However, if the material is a conductor having a high resistance to oxidation, oxidation degradation at the time of an operation under the atmospheric pressure can be prevented. In this patent application, to have a high resistance to oxidation means to have a small oxide formation reaction. In general, according to a thermodynamic calculation, when a value of a change $\Delta G$ [kJ/mol] in free energy of oxide formation is negative and greater, the oxide formation reaction occurs more easily. In the present invention, a metal element whose $\Delta G$ is equal to or greater than −450 [kJ/mol] is considered to be the conductive fine particles having a high resistance to oxidation. Further, the conductive fine particles having a high resistance to oxidation also include conductive fine particles whose oxide formation reaction is made difficult to occur by attaching an insulating material smaller than the conductive fine particles to the conductive fine particles or by coating the conductive fine particles with use of such an insulating material. The conductive fine particles having a high resistance to oxidation makes it possible to prevent element degradation such as oxidation caused by oxygen in the atmosphere. This makes it possible to extend a life of the electron emitting element.

Examples of materials of the conductive fine particles that have a high resistance to oxidation are noble metal such as gold, silver, platinum, palladium, and nickel. The conductive fine particles 6 can be produced by using a known fine particle production method such as a sputtering method or a spray heating method. It is also possible to use commercially available conductive fine particle powder such as silver nanoparticles manufactured and marketed by Applied Nano Particle Laboratory Co. A principle of generating ballistic particles will be described later.

In the present embodiment, because control of electric conductivity is required, an average particle diameter of the conductive fine particles 6 has to be smaller than that of the insulating fine particles 5. The conductive fine particles 6 preferably have an average particle diameter in a range of 3 nm to 10 nm. In a case where, as described above, the average particle diameter of the conductive fine particles 6 is arranged to be smaller than that of the insulating fine particles 5 and preferably in a range of 3 nm to 10 nm, a conductive path made of the conductive fine particles 6 is not formed in the electron acceleration layer 4. As a result, dielectric breakdown becomes difficult to occur in the electron acceleration layer 4. The principle has a lot of unexplained points; however, the ballistic electrons are efficiently generated by use of the conductive fine particles 6 whose average particle diameter is within the above range.

A ratio of the conductive fine particles 6 in the entire electron acceleration layer 4 is preferably in a range of 0.5% by weight to 30% by weight. In a case where the ratio is smaller than 0.5% by weight, the conductive fine particles 6 cannot serve as conductive fine particles that provide an effect of increasing a current in element. In a case where the ratio is greater than 30% by weight, aggregation of the conductive fine particles occurs. The ratio of the conductive fine particles is more preferably in a range of 1% by weight to 10% by weight, in particular.

Note that a conductive fine particle 6 may be surrounded by a small insulating material that is an insulating material whose size is smaller than the conductive fine particle 6. This small insulating material can be an adhering substance which adheres to a surface of the conductive fine particle 6. Further, the adhering substance may be an insulating coating film that coats the surface of the conductive fine particle 6 and that is made as an aggregate of particles whose average particle diameter is smaller than that of the conductive fine particle 6. In view of the operation principle for generating ballistic electrons, any insulating material can be used as the small insulating material. However, in a case where the insulating material whose size is smaller than that of the conductive fine particle 6 is the insulating coating film coating the surface of the conductive fine particle 6 and an oxide film of the conductive fine particle 6 is used as the insulating coating film, a thickness of the oxide film may be increased to a thickness larger than a desired thickness due to oxidation degradation in the atmosphere. For the purpose of preventing the oxidation degradation at the time of an operation under the atmospheric pressure, the insulating coating film is preferably made of an organic material. Examples of the organic material include: alcoholate, aliphatic acid, and alkanethiol. A thinner insulating coating film is more advantageous.

The binder component 15 may be any material, as long as the material has an insulating property and sufficient adhesiveness with respect to the electrode substrate 2 and the insulating fine particles 5 and the conductive fine particles 6 can be dispersed in the binder component 15. The binder component 15 may be made of resin such as: tetramethoxysilane, tetraethoxysilane, methyltrimethoxysilane, methyltriethoxysilane, phenyltriethoxysilane, hexyltrimethoxysilane, decyltrimethoxysilane, hydrolysable group-containing siloxane, vinyltrimethoxysilane, vinyltriethoxysilane, 2-(3,4epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-meth acryloxypropyltrimethoxysilane, 3-methacryloxypropylethoxysilane, 3-acryloxypropyltrimethoxysilane, N-2-(aminoethyl)-3-aminopropyltrimethoxysilane, N2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-ureidopropyltriethoxysilane, 3-chloropropyltrimethoxysilane, 3-mercaptopropyltrimethoxysilane, bis(triethoxysilyl)tetrasulfide, and 3-isocyanatepropyltriethoxysilane. The above resins can be used solely or in combination of two or more kinds.

In a case where the electron acceleration layer 4 on the electrode substrate 2 is made of the conductive fine particles 6 and the insulating fine particles 5, mechanical strength of the electron emitting element 1 becomes weak. Accordingly, when the thin-film electrode 3 is formed on the electron acceleration layer 4, the thin-film electrode 3 becomes brittle and tends to break down. Consequently, electron emission becomes unsteady. However, when the conductive fine particles 6 and the insulating fine particles 5 are dispersed in the binder component 15, the mechanical strength of the electron emitting element 1 increases because the binder component (resin binder) 15 made of resin has a high adhesiveness with respect to the electrode substrate 2 and has a high mechanical strength.

Further, in a case where the conductive fine particles 6 and the insulating fine particles 5 are dispersed in the binder component 15, aggregation becomes hard to occur. Accordingly, performance of the electron emitting element 1 becomes uniform, and steady electron supply becomes possible. In addition, the binder component 15 can improve smoothness of a surface of the electron acceleration layer 4 and makes it possible to form the thin-film electrode 3 thinly on the electron acceleration layer 4.

Because the electron acceleration layer 4 includes the binder component 15 and the binder component 15 is present around the conductive fine particles 6, element degradation due to oxidation of the conductive fine particles 6 caused by oxygen in the atmosphere becomes hard to occur. Accordingly, the electron emitting element 1 can be steadily operated not only in vacuum but also under the atmospheric pressure.

The thinner the electron acceleration layer 4 is, the more intense the electric field becomes. Therefore, even by a low voltage application, electrons can be accelerated in the case where the electron acceleration layer 4 is thin. However, it is preferable that the electron acceleration layer 4 has a thickness in a range of 12 nm to 6000 nm, and more preferably 300 nm to 6000 nm. This is because the thickness of the electron acceleration layer 4 in the above range makes it possible (i) to make a layer thickness of the electron acceleration layer even and (ii) to control a resistance of the electron acceleration layer in a layer thickness direction.

The following explanation deals with a principle of the electron emission. FIG. 2 is a schematic view magnifying the vicinity of the electron acceleration layer 4 in the electron emitting element 1. As illustrated in FIG. 2, the electron acceleration layer 4 is made mostly of the insulating fine particles 5 and the binder component 15, and the conductive fine particles 6 are scattered in gaps between the insulating fine particles 5. The electron acceleration layer 4 includes the insulating fine particles 5, the binder component 15, and a small number of conductive fine particles 6, thereby having a semi-conductive property.

Therefore, a voltage application to the electron acceleration layer 4 causes very weak current flow. A volt-ampere characteristic of the electron acceleration layer 4 shows a so-called varistor characteristic, and a current value sharply increases as an applied voltage increases. A part of electrons in the current become ballistic electrons due to an intense electric field formed within the electron acceleration layer 4 by the applied voltage. The ballistic electrons are emitted to the outside of the electron emitting element 1 by transmitting though the thin-film electrode 3 and/or through gaps in the thin-film electrode 3. A generation process of the ballistic electrons has not been determined, but it is considered that the ballistic electrons are generated by simultaneous acceleration and tunneling of electrons in a direction of an electric field.

As described above, in the electron emitting element 1, the electron acceleration layer 4 is a layer that is a thin film in which the insulating fine particles 5 and the conductive fine particles 6 are dispersed in the binder component 15. Here, because the conductive fine particles 6 are dispersed in the binder component 15, in other words, the binder component 15 is present around the conductive fine particles 6, element degradation due to oxidation caused by oxygen in the atmosphere becomes difficult to occur. Therefore, the electron emitting element 1 can be steadily operated not only in vacuum but also under the atmospheric pressure. Further, because the insulating material 5 and the conductive fine particles 6 are dispersed in the binder component 15, aggregation is difficult to occur. As a result, performance of the electron emitting element 1 becomes uniform and the electron emitting element 1 can steadily supply electrons. Furthermore, the binder component 15 has a high adhesiveness with respect to the electrode substrate 2 and a high mechanical strength. In addition, the binder component 15 can make an uneven surface of the electron acceleration layer 4 even, so that the thin-film electrode 3 can be formed thinly.

As a result, the electron emitting element 1 has uniform performance and a high mechanical strength, because the electron acceleration layer 4 can be formed so as to be a thin film in which the insulating material 5 and the conductive fine particles 6 are substantially evenly dispersed.

In this way, the electron emitting element 1 can prevent degradation of the electron acceleration layer 4 and can efficiently and steadily emit electrons not only in vacuum but also under the atmospheric pressure. Further, the electron emitting element 1 can improve the mechanical strength simply at low cost.

The following explanation deals with an embodiment of a method for producing the electron emitting element 1.

Firstly, the insulating material 5 and the resin binder 15 are dispersed in an organic solvent so as to give an insulating material-containing resin binder dispersion solution. The organic solvent used here is not specifically limited as long as the insulating material 5 and the resin binder 15 can be dispersed in the organic solvent and dried after application of the organic resin binder dispersion solution. Examples of the organic solvent are: methanol, ethanol, propanol, 2-propanol, butanol, and 2-butanol. These organic solvents can be used solely or in combination of two or more kinds. A dispersion method is not specifically limited. For example, the dispersion can be performed by use of an ultrasonic dispersion device at a normal temperature. A content of the insulating material is preferably in a range of 3% by weight to 50% by weight. In a case where the content is less than 3% by weight, the insulating material does not serve as an insulator that provides an effect of controlling a resistance of the electron acceleration layer 4. Meanwhile, in a case where the content is more than 50% by weight, the aggregation of the insulating material 5 occurs. The content is more preferably in a range of 20% by weight to 30% by weight, in particular.

Then, a conductive fine particle solution is mixed with the obtained insulating material-containing resin binder solution, so as to give an insulating material and the conductive fine particle mixture solution. A method of mixing the solutions is not specifically limited. For example, the solutions may be stirred at a normal temperature. When the solutions are mixed, a conductive fine particle solution in which the conductive fine particles are dispersed in an organic solvent should be used in a case where the conductive fine particles are in a form of powder. This organic solvent is not specifically limited as long as the conductive fine particles 6 can be dispersed in the organic solvent and can be dried after application of the solution. Examples of the organic solvent are hexane and toluene. A content of the conductive fine particles is preferably in a range of 0.5% by weight to 30% by weight. In a case where the content is less than 0.5% by weight, the conductive fine particles 6 do not serve as conductive fine particles that provide an effect of increasing current in the element. Meanwhile, in a case where the content is more than 30% by weight, aggregation of the conductive fine particles occurs. The content is more preferably 2% by weight to 20% by weight, in particular.

Then, the electron acceleration layer 4 is formed by applying, by a spin coating method, the insulating material and the conductive fine particle mixture solution obtained as described above on the electrode substrate 2. A predetermined film thickness can be obtained by repeating, a plurality of times, (i) film formation by the spin coating method and (ii) drying. Other than the spin coating method, the electron acceleration layer 4 can be formed by, for example, a dropping method or a spray coating method. Then, the thin-film electrode 3 is formed on the electron acceleration layer 4. For forming the thin-film electrode 3, a magnetron sputtering method can be used, for example. The thin-film electrode 3 may be formed by, for example, an ink-jet method, a spin coating method, or a vapor deposition method.

Example 1

The following explains an experiment in which current measurement was carried out by use of electron emitting elements according to Embodiment 1. Note that this experiment is merely an example of the present embodiment and by no means limits the present invention.

Figure 3:
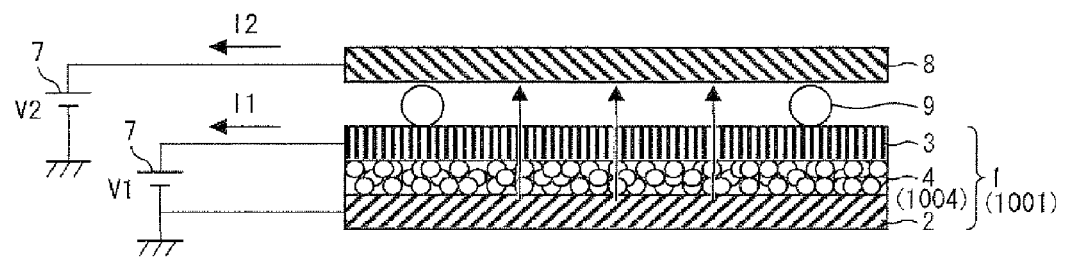
FIG. 3 is a diagram illustrating an experiment system used in measurement of electron emission current.

First, electron emitting elements of Examples 1-1 to 1-4 were produced as described below. Then, an experiment was carried out on the electron emitting elements of Examples 1-1 to 1-4. In the experiment, electron emission current per unit area was measured by using an experiment system as shown in FIG. 3. In the experiment system of FIG. 3, a counter electrode 8 was provided on a side of the thin-film electrode 3 of the electron emitting element 1 so that the counter electrode 8 and the thin-film electrode 3 sandwiched an insulating spacer 9. Each of the electron emitting element 1 and the counter electrode 8 was connected to a power supply 7 so that a voltage V1 was applied to the electron emitting element 1 and a voltage V2 was applied to the counter electrode 8. The above experiment system was set up in vacuum at $1 \times 10^{-8}$ ATM and an electron emission experiment was carried out. In the experiment, a distance via the insulating spacer 9 between the electron emitting device and the counter electrode was set to 5 mm. Moreover, an applied voltage V2 to the counter electrode was set to 100V.

Example 1-1

First, 2.0 g of ethanol solvent and 0.5 g of tetramethoxysilane KBM-04 (manufactured by Shin-Etsu Chemical Co., Ltd.) were supplied into a 10 mL reagent bottle, and then 0.5 g of spherical silica particles AEROSIL R8200 (manufactured by Evonik Degussa Japan Co., Ltd., average particle diameter: 12 nm) were added as the insulating material 5. The reagent bottle was then set in an ultrasonic dispersion device so that an insulating material-containing resin binder dispersion solution A was prepared. A content of the insulating material in the dispersion solution A was 17% by weight.

Next, the dispersion solution A obtained as described above and a conductive fine particle solution containing the conductive fine particles 6 were mixed. The conductive fine particle solution containing the conductive fine particles 6 used in the present example was a silver nanoparticle-containing hexane dispersion solution (manufactured by Applied Nano Particle Laboratory Co., average particle diameter of silver fine particles: 4.5 nm, solid content of silver fine particles: 7%). To 1.0 g of the insulating material-containing resin binder dispersion solution A, 1.0 g of the silver nanoparticle-containing hexane dispersion solution was added, and the solutions were stirred at a normal temperature so that an insulating material and conductive fine particle mixture solution B was obtained. A content of the conductive fine particles 6 in the mixture solution B was 4.5% by weight.

After the mixture solution B obtained as described above was dropped on a 30 mm square SUS substrate as the electrode substrate 2, an insulating material and conductive fine particle-containing resin binder was deposited by spin coating at 8000 rpm for 10 s. As a result, the electron acceleration layer 4 was obtained. A film thickness of the electron acceleration layer 4 was approximately 0.81 μm.

On a surface of the electron acceleration layer 4, the thin-film electrode 3 was formed by using a magnetron sputtering device, and thereby the electron emitting element of Example 1-1 was obtained. Gold was used as a material for forming the thin-film electrode 3. A thickness of the thin-film electrode 3 was 30 am and an area thereof was 0.014 cm$^2$.

The experiment system, as illustrated in FIG. 3, employing the electron emitting element was placed in vacuum at $1\times10^{-8}$ ATM. When an applied voltage V1 of 27.4 V was applied to the thin-film electrode and an applied voltage V2 of 100 V was applied to the counter electrode, an electron emission current per unit area of 0.21 mA/cm$^2$ was observed.

Example 1-2

The dispersion solution A obtained as in Example 1-1 and a conductive fine particle solution containing the conductive fine particles 6 were mixed. The conductive fine particle solution containing the conductive fine particles 6 used here was a gold nanoparticle-containing naphthene dispersion solution (manufactured by Harima Chemicals, Inc., average particle diameter of gold fine particles: 5.0 nm, solid content of gold fine particles: 52%). To 3.0 g of the dispersion solution A, 0.68 g of the gold nanoparticle-containing naphthene dispersion solution was added, and the solutions were stirred at a normal temperature so that insulating material and conductive fine particle mixture solution C was obtained. A content of the conductive fine particles 6 in the mixture solution C was 9.6% by weight.

After the mixture solution C obtained as described above was dropped on a 30 mm square SUS substrate as the electrode substrate 2, an insulating material and conductive fine particle-containing resin binder was deposited by spin coating at 3000 rpm for 10 s. As a result, the electron acceleration layer 4 was obtained. A film thickness of the electron acceleration layer 4 was approximately 1.6 μm.

On a surface of the electron acceleration layer 4, the thin-film electrode 3 was formed by using a magnetron sputtering device, and thereby the electron emitting element of Example 1-2 was obtained. Gold was used as a material for forming the thin-film electrode 3. A thickness of the thin-film electrode 3 was 40 nm and an area thereof was 0.014 cm$^2$.

The experiment system, as illustrated in FIG. 3, employing the electron emitting element was placed in vacuum at $1\times10^{-8}$ ATM. When an applied voltage V1 of 27.5 V was applied to the thin-film electrode and an applied voltage V2 of 100 V was applied to the counter electrode, an electron emission current per unit area of 0.39 mA/cm$^2$ was observed.

Example 1-3

First, 2.5 g of methanol solvent and 0.5 mL of methyltrimethoxysilane KBM-13 (manufactured by Shin-Etsu Chemical Co., Ltd.) were supplied into a 10 mL reagent bottle, and then 0.5 g of spherical silica particles AEROSIL RX200 (manufactured by Evonik Degussa Japan Co., Ltd., average particle diameter: 12 nm) were added as the insulating material 5. The reagent bottle was then set in an ultrasonic dispersion device so that an insulating material-containing resin binder dispersion solution D was prepared. A content of the insulating material in the dispersion solution D was 14° A) by weight.

Into a 10 mL reagent bottle, 2.5 g of toluene solvent was poured and then 0.5 g of silver nanoparticles (manufactured by Applied Nano Particle Laboratory Co., average particle diameter of silver fine particles: 10 nm) were added as the conductive fine particles 6. Then, the reagent bottle was set in an ultrasonic dispersion device so as to give a conductive fine particle solution E.

To 1.0 g of the dispersion solution D, this conductive fine particle solution E was added, and the solutions were stirred at a normal temperature so as to give an insulating material and conductive fine particle mixture solution F. A content of the conductive fine particles 6 in the mixture solution F was 8.3% by weight.

After the mixture solution F obtained as described above was dropped on a 30 mm square SUS substrate as the electrode substrate 2, an insulating material and conductive fine particle-containing resin binder was deposited by spin coating at 6000 rpm for 10 s. As a result, the electron acceleration layer 4 was obtained. A film thickness of the electron acceleration layer 4 was approximately 1.2 μm.

On a surface of the electron acceleration layer 4, the thin-film electrode 3 was formed by using a magnetron sputtering device, and thereby the electron emitting element of Example 1-3 was obtained. Gold was used as a material for forming the thin-film electrode 3. A thickness of the thin-film electrode 3 was 40 nm and an area thereof was 0.014 cm$^2$.

The experiment system, as illustrated in FIG. 3, employing the electron emitting element was set up in vacuum at $1\times10^{-8}$ ATM. When an applied voltage V1 of 20.0 V was applied to the thin-film electrode and an applied voltage V2 of 100 V was applied to the counter electrode, an electron emission current per unit area of 1.00 mA/cm$^2$ was observed.

Example 1-4

First, 2.5 g of ethanol solvent and 0.5 g of tetramethoxysilane KBM-04 (manufactured by Shin-Etsu Chemical Co., Ltd.) were supplied into a 10 mL reagent bottle, and then 0.5 g of spherical silica particles EP-C413 (manufactured by Cabot Corporation, average particle diameter: 50 nm) were added as the insulating material 5. The reagent bottle was then set in an ultrasonic dispersion device so that an insulating material-containing resin binder dispersion solution G was prepared. A content of the insulating material 5 in the dispersion solution G was 14% by weight.

As the conductive fine particle solution containing the conductive fine particles 6, a gold nanoparticle-containing naphthene dispersion solution (manufactured by Harima Chemicals, Inc., average particle diameter of gold fine particles: 5.0 nm, solid content of gold fine particles: 52%) was used. To 3.0 g of the dispersion solution G, 0.68 g of the gold nanoparticle-containing naphthene dispersion solution was added, and the solutions were stirred at a normal temperature so that an insulating material and conductive fine particle mixture solution H was obtained. A content of the conductive fine particles in the mixture solution H was 9.6% by weight.

After the mixture solution H obtained as described above was dropped on a 30 mm square SUS substrate as the electrode substrate 2, an insulating material and conductive fine particle-containing resin binder was deposited by spin coating at 3000 rpm for 10 s. As a result, the electron acceleration layer 4 was obtained. A film thickness of the electron acceleration layer 4 was approximately 1.7 μm.

On a surface of the electron acceleration layer 4, the thin-film electrode 3 was formed by using a magnetron sputtering device, and thereby the electron emitting element of Example 1-4 was obtained. Gold was used as a material for forming the thin-film electrode 3. A thickness of the thin-film electrode was 40 nm and an area thereof was 0.014 cm$^2$.

The experiment system, as illustrated in FIG. 3, employing the electron emitting element was set up in vacuum at $1 \times 10^{-8}$ ATM. When an applied voltage V1 of 18.5 V was applied to the thin-film electrode and an applied voltage V2 of 100 V was applied to the counter electrode, an electron emission current per unit area of 1.17 mA/cm$^2$ was observed.

Each of the electron emitting elements of the above examples included, in the electron acceleration layer 4, the resin binder in which the insulating material and the conductive fine particles were dispersed. However, in a modified example of the electron emitting elements, that is, an electron acceleration layer 4' including a resin binder in which only the insulating material was dispersed, electron emission was also observed. The following explains such a modified example.

Modified Example 1

After the dispersion solution A obtained as in Example 1 was dropped on a 30 mm square SUS substrate as the electrode substrate 2, insulating material-containing resin binder was deposited by spin coating at 3000 rpm for 10 s so that the electron acceleration layer was obtained. A film thickness of the electron acceleration layer was approximately 1.5 nm.

On a surface of the electron acceleration layer, the thin-film electrode 3 was formed by using a magnetron sputtering device, and thereby the electron emitting element of Modified Example 1 was obtained. Gold was used as a material for forming the thin-film electrode 3. A thickness of the thin-film electrode 3 was 40 nm and an area thereof was 0.014 cm$^2$.

The experiment system, as illustrated in FIG. 3, employing the electron emitting element of this modified example was set up in vacuum at $1 \times 10^{-8}$ ATM. When an applied voltage V1 of 17.2 V was applied to the thin-film electrode and an applied voltage V2 of 100 V was applied to the counter electrode, an electron emission current per unit area of 0.05 mA/cm$^2$ was observed.

Embodiment 2

FIG. 1 is a schematic view illustrating a configuration of another embodiment of an electron emitting device including an electron emitting element of the present invention. As illustrated in FIG. 1, an electron emitting element 1001 of the present embodiment includes an electrode substrate 2 serving as a lower electrode, a thin-film electrode 3 serving as an upper electrode, and an electron acceleration layer 1004 sandwiched between the electrode substrate 2 and the thin-film electrode 3. Further, the electrode substrate 2 and the thin-film electrode 3 are connected to a power supply 7 so that a voltage can be applied between the electrode substrate 2 and the thin-film electrode 3 which are provided so as to face each other. The electron emitting element 1001 and the power supply 7 constitute an electron emitting device 1010.

Note that members that have identical functions to those of members described in Embodiment 1 are given the same reference signs, and the explanations thereof are omitted.

Figure 12:
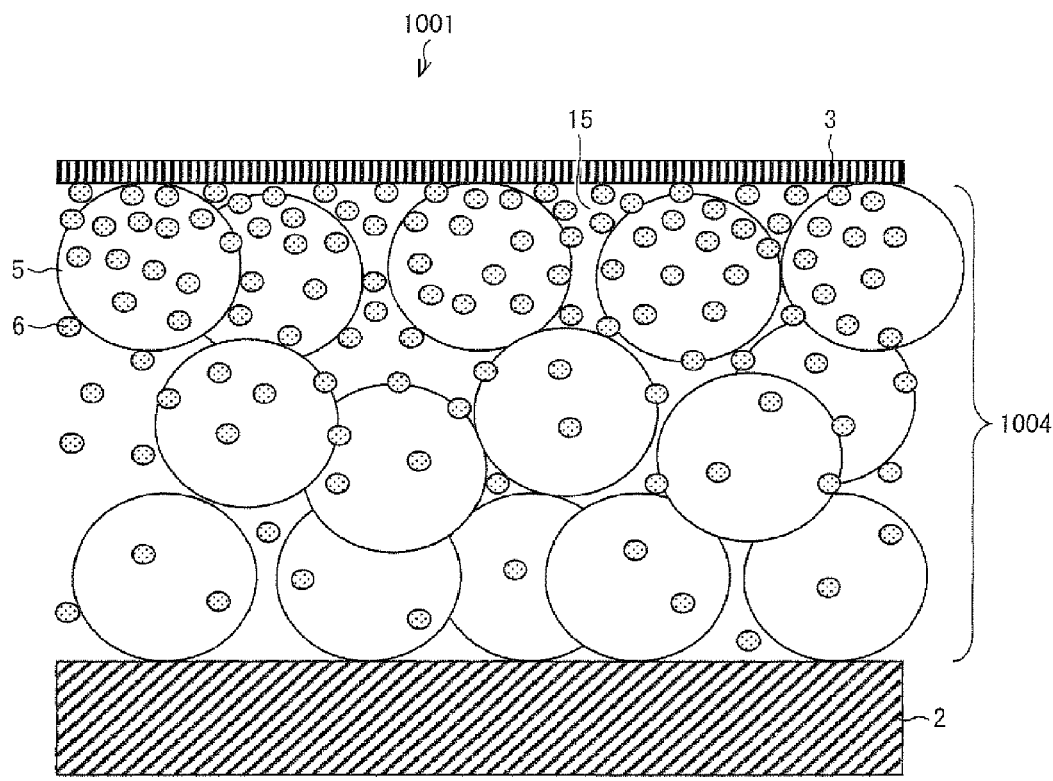
FIG. 12 is an enlarged view of the vicinity of an electron acceleration layer in the electron emitting element of Embodiment 2 of the present invention.

As shown in FIG. 12, the electron acceleration layer 1004 includes a binder component 15 in which conductive fine particles 6 and insulating fine particles 5 are dispersed. For example, the binder component 15 may be made from silicone resin and configured by (i) burning the silicone resin so that the silicone resin is changed to silica (insulating material) and (ii) dispersing, in this silica, the insulating fine particles 5 and the conductive fine particles 6. Further, in the electron acceleration layer 1004, the conductive fine particles 6 are dispersed in large numbers on a side of the thin-film electrode 3.

When the electron acceleration layer 1004 is to be formed by applying the conductive fine particles 6 on a layer of the binder component 15 including the insulating fine particles 5, most of the conductive fine particles 6 that are applied and have an average particle diameter of 3 nm to 10 nm do not permeate inside the layer of the binder component 15 including the insulating fine particles 5 but are accumulated on the layer in a case where the insulating fine particles 5 have an average particle diameter of less than 10 nm. In such a case, the electron emitting element 1001 cannot provide an advantageous effect as an electron emitting element. Meanwhile, in a case where the insulating fine particles 5 have an average particle diameter of more than 200 nm, most of the conductive fine particles 6 that are applied and have an average particle diameter in a range of 3 nm to 10 nm do not stay on the binder component 15 including the insulating fine particles 5. Therefore, in a case where the conductive fine particles 6 having the average particle diameter of 3 nm to 10 nm are used, the average particle diameter of the insulating fine particles 5 is preferably in a range of 10 nm to 200 nm.

In the electron acceleration layer 1004, the conductive fine particles 6 are dispersed in large numbers on a side of the thin-film electrode 3. Therefore, an electric field becomes more intense in the vicinity of the thin-film electrode 3 and electron emission efficiency of the electron emitting element 1001 becomes high.

As described above, in the electron emitting element 1001, the electron acceleration layer 1004 is a thin-film layer in which the insulating fine particles 5 and the conductive fine particles 6 are dispersed in the binder component 15. Because the conductive fine particles 6 are dispersed in large numbers on the side of the thin-film electrode 3, the electric field becomes more intense in the vicinity of the thin-film electrode 3 and electron emission efficiency of the electron emitting element 1001 becomes high. Further, the conductive fine particles 6 are dispersed in the binder component 15, in other words, the binder component 15 is present around the conductive fine particles 6, element degradation due to oxidation caused by oxygen in the atmosphere is difficult to occur. Therefore, the electron emitting element 1001 can be steadily operated not only in vacuum but also under the atmospheric pressure. Further, because the insulating fine particles 5 and the conductive fine particles 6 are dispersed in the binder component 15, aggregation becomes difficult to occur. As a result, performance of the electron emitting element 1001 becomes uniform and the electron emitting element 1001 can steadily supply electrons. Furthermore, the binder component 15 has a high adhesiveness with respect to the electrode substrate 2 and a high mechanical strength. In addition, the binder component 15 can make an uneven surface of the electron acceleration layer 1004 even, so that the thin-film electrode 3 can be formed thinly.

In this way, the electron emitting element 1001 can emit electrons at a high efficiency and also can prevent degradation of the electron acceleration layer 1004. As a result, the electron emitting element 1004 can efficiently and steadily emit electrons not only in vacuum but also under the atmospheric pressure. In addition, the electron emitting element 1001 can have an improved mechanical strength.

The following explanation deals with an embodiment of a method for producing the electron emitting element 1001.

Firstly, the insulating fine particles 5 are dispersed in the binder component 15 so that an insulating fine particle-containing binder component dispersion solution is obtained. For example, the insulating fine particle-containing binder component dispersion solution can be obtained by dispersing, in an organic solvent, the insulating fine particles 5 and the binder component 15. The organic solvent used here is not specifically limited as long as the insulating fine particles 5 and the binder component 15 can be dispersed in the organic solvent and dried after application of the dispersion solution. Examples of the organic solvent are: methanol, ethanol, propanol, 2-propanol, butanol, and 2-butanol. These organic solvents can be used solely or in combination of two or more kinds. A dispersion method is not specifically limited. For example, dispersion by stirring at a normal temperature or dispersion by use of an ultrasonic dispersion device at a normal temperature can be performed. A content of the insulating fine particles 5 is preferably in a range of 1% by weight to 50% by weight. In a case where the content is less than 1% by weight, the insulating fine particles 5 do not serve as an insulator that provides an effect of controlling a resistance of the electron acceleration layer 1004. Meanwhile, in a case where the content is more than 50% by weight, aggregation of the insulating fine particles 5 occurs. The content is more preferably in a range of 5% by weight to 20% by weight, in particular.

Next, the conductive fine particles 6 are dispersed in a solvent so as to give a conductive fine particle dispersion solution. For example, the conductive fine particle dispersion solution can be obtained by dispersing the conductive fine particles 6 in an organic solvent. A dispersion method is not specifically limited. For example, stirring at a normal temperature can be performed. This organic solvent is not specifically limited as long as the conductive fine particles 6 are dispersed in the organic solvent and can be dried after application of the dispersion solution. Examples of the organic solvent are naphthene, hexane and toluene.

Then, the insulating fine particle containing binder component dispersion solution produced as described above is applied on the electrode substrate 2 so that an insulating fine particle-containing binder component layer is obtained (step of forming a binder component layer). For the application of the dispersion solution here, for example, a spin coating method can be used. Subsequently, the conductive fine particle dispersion solution prepared as described above is applied (step of applying the conductive fine particle dispersion solution) on the insulating fine particle-containing binder component layer. Here, if the insulating fine particle-containing binder layer dries at a normal temperature and does not change over time, the application of the conductive fine particle dispersion solution can be performed immediately after the drying.

The application of the conductive fine particle dispersion solution may be performed in any way. However, if a spin coating method is employed, the conductive fine particles can be applied very easily in a broad area on the insulating fine particles that are dispersed in the binder component. Therefore, the spin coating method can be suitably used for a device required to emit electrons in a broad area. Further, the spin coating method can be used for any kind of conductive fine particles to be applied.

Conditions in a case where the spin coating method is used are not specifically limited. However, the number of spins is preferably in a range of 1000 rpm to less than 8500 rpm and, in particular, preferably in a range of 3000 rpm to less than 6500 rpm. In a case where the number of spins is less than 1000 rpm, too much conductive fine particles remain on the insulating fine particle-containing binder component layer and a conductive layer made of the conductive fine particles is formed between the electron acceleration layer 1004 and the thin-film electrode 3. As a result, accelerated electrons are scattered and an amount of electrons emitted decreases. Further, because many conductive fine particles permeate the insulating fine particle-containing binder component layer, a conductive path tends to be formed. As a result, a large amount of current flows in the element at a low voltage and an amount of electrons emitted decreases. Meanwhile, in a case where the number of spins is 8500 rpm or more, only a small amount of conductive fine particles permeate the insulating fine particle-containing binder component layer. As a result, the electrons cannot be effectively accelerated in the electron acceleration layer.

If a spraying method is used for application of the conductive fine particle dispersion solution, the conductive fine particles can be discharged in very tiny droplets. As a result, the conductive fine particles can be applied thinly and evenly on the insulating fine particles that are dispersed in the binder component. Examples of the spraying method are an ultrasonic spray method, a spray method, and an electrostatic spray method. In consideration of the advantageous points such that splash of sprayed droplets can be prevented and that a diameter of sprayed droplets can be easily controlled to be small, the electrostatic spray method is particularly preferable.

Conditions in a case where the electrostatic spry method is used are not specifically limited. However, an internal diameter of a syringe used in the electrostatic spray method is preferably in a range of 0.11 mm to less than 2.16 mm, and, in particular, preferably in a range of 0.21 nm to less than 0.51 nm. In a case where the internal diameter is less than 0.11 mm, clogging often occurs. In a case where the internal diameter is 2.16 mm or more, a diameter of landing droplets of the conductive fine particle dispersion solution becomes large and the landing droplets overlap with each other. Therefore, too many conductive fine particles remain on the insulating fine particle-containing binder component layer and an amount of electrons emitted decreases due to the same phenomenon as described above. Further, because many conductive fine particles permeate the insulating fine particle-containing binder component layer, an amount of electrons emitted decreases due to the same phenomenon as described above. A flow rate of liquid is preferably in a range of 0.2 μL/min to less than 10 mL/min, and, in particular, preferably in a range of 1.0 μL/min to less than 1.0 mL/min. In a case where the flow rate is less than 0.2 μL/min, only a small amount of conductive fine particles permeate the insulating fine particle-containing binder component layer because the droplets are small. As a result, the electrons cannot be effectively accelerated in the electron acceleration layer. Meanwhile, in a case where the flow rate is 10 mL/min or more, a diameter of landing droplets becomes large. Therefore, too many conductive fine particles remain on the insulating fine particle-containing binder component layer and an amount of electrons emitted decreases due to the same phenomenon as described above. Further, because many conductive fine particles permeate the insulating fine particle-containing binder component layer, an amount of electrons emitted decreases due to the same phenomenon as described above.

In a case where an ink-jet method is used for applying the conductive fine particle dispersion solution, it becomes possible to control a density at which the conductive fine particles are applied and a position in which the conductive fine particles are applied on the insulating fine particles that are dispersed in the binder component. Therefore, the ink-jet method is suitably used for a device that needs to be patterned, a switching element and the like.

Conditions in a case where the ink-jet method is used are not specifically limited. However, a discharge volume is preferably in a range of 0.1 fL to less than 100 pL. In a case where the discharge volume is less than 0.1 fL, only a small amount of conductive fine particles permeate the insulating fine particle-containing binder component layer because the droplets are small. As a result, the electrons cannot be effectively accelerated in the electron acceleration layer. Meanwhile, in a case where the discharge volume is 100 pL or more, too many conductive fine particles remain on the insulating fine particle-containing binder component layer and an amount of electrons emitted decreases due to the same phenomenon as described above. Further, because many conductive fine particles permeate the insulating fine particle-containing binder component layer, an amount of electrons emitted decreases due to the same phenomenon as described above.

In this way, the electron acceleration layer 1004 is formed. As described above, the electron acceleration layer 1004 is formed by applying, on the binder component layer in which the insulating fine particles are dispersed, the dispersion solution of the conductive fine particles having an average particle diameter smaller than that of the insulating fine particles. Here, the conductive fine particles applied on the binder component layer permeate inside the binder component layer including the insulating fine particles. Therefore, the insulating fine particles 5 and the conductive fine particles 6 are dispersed in the binder component 15 so that the conductive fine particles 6 are dispersed in large numbers on a side of the thin-film electrode 3. As a result, the electron acceleration layer 1004 is formed.

A method of forming the electron acceleration layer 1004 is not limited, as long as the electron acceleration layer 1004 is formed so that the insulating fine particles 5 and the conductive fine particles 6 are dispersed in the binder component 15 and the conductive fine particles 6 are dispersed in large numbers on the side of the thin-film electrode 3. For example, the electron acceleration layer 1004 may be formed as follows. That is, the binder component may be made from silicone resin and configured by (i) applying, on the electrode substrate, the silicone resin in which the insulating fine particles are dispersed, (ii) burning the silicone resin so that the silicone resin is changed to silica (insulating material) and (iii) applying, on this silica in which the insulating fine particles are dispersed, the dispersion solution including the conductive fine particles, and causing the dispersion solution to permeate the silica.

After the electron acceleration layer 1004 is formed, the thin-film electrode 3 is formed on the electron acceleration layer 1004.

Example 2

The following explains an experiment in which current measurement was carried out by use of electron emitting elements according to Embodiment 2. Note that this experiment is merely an example of the present embodiment and by no means limits the present invention.

First, electron emitting elements of Examples 2-1 to 2-4 and Comparative Example 2-1 were produced as described below. Then, an experiment was carried out on the electron emitting elements produced. In the experiment, electron emission current per unit area was measured by using an experiment system as shown in FIG. 3 as in Example 1. The experiment system was set up in vacuum at $1\times10^{-8}$ ATM and an electron emission experiment was carried out. In the experiment, a distance via the insulating spacer 9 between the electron emitting device and the counter electrode was set to 5 mm. Moreover, an applied voltage V2 to the counter electrode was set to 100 V.

Example 2-1

First, 4.0 g of ethanol as a solvent and 0.5 g of methyltrimethoxysilane KBM-13 (manufactured by Shin-Etsu Chemical Co., Ltd.) were supplied into a 10 mL reagent bottle, and then 0.5 g of spherical silica particles AEROSIL R8200 (manufactured by Evonik Degussa Japan Co., Ltd., average particle diameter: 12 nm) were added as the insulating fine particles 5. The reagent bottle was then set in an ultrasonic dispersion device so that an insulating fine particle-containing binder component dispersion solution A was prepared. A content of the insulating fine particles in the dispersion solution A was 10% by weight.

Next, after the dispersion solution A obtained as described above was dropped on a 30 mm square SUS substrate as the electrode substrate 2, an insulating fine particle-containing binder component layer I was formed by spin coating at 3000 rpm for 10 s and dried at a room temperature. Because the insulating fine particle-containing binder component layer I does not change over time, a next process was carried out immediately after the drying.

In the next step, a gold nanoparticle-containing naphthene dispersion solution (manufactured by Harima Chemicals, Inc., average particle diameter of gold fine particles: 5.0 nm, solid content of gold fine particles: 52%) was dropped, as the conductive fine particle dispersion solution in which the conductive fine particles 6 were dispersed in a solvent, on the insulating fine particle-containing binder component layer I. Then, by spin coating at 6000 rpm for 10 s, the electron acceleration layer 1004 was formed. In other words, the electron acceleration layer 1004 in which the insulating fine particles 5 and the conductive fine particles 6 were dispersed in the binder component was formed by causing the insulating fine particles to permeate the insulating fine particle-containing binder component layer I.

On a surface of the electron acceleration layer 1004 formed as described above, the thin-film electrode was formed by using a magnetron sputtering device, and thereby the electron emitting element of Example 2-1 was obtained. Gold was used as a material for forming the thin-film electrode 3. A thickness of the thin-film electrode 3 was 40 nm and an area thereof was 0.014 cm$^2$.

The electron emitting element was placed in vacuum at $1\times10^{-8}$ ATM. When an applied voltage V1 of 29.6 V was applied to the thin-film electrode 3 and an applied voltage V2 of 100 V was applied to the counter electrode, an electron emission current per unit area of 0.46 mA/cm$^2$ and a current in element of 115 mA/cm$^2$ were observed, and an electron emission efficiency was 0.4%. Further, in a TEM photograph of the electron emitting element of Example 2-1, it was found that the conductive fine particles 6 were dispersed in large numbers on a side of the thin-film electrode 3 in the electron acceleration layer 1004.

Example 2-2

After a silver nanoparticle-containing hexane dispersion solution (manufactured by Applied Nano Particle Laboratory Co., average particle diameter of silver fine particles: 4.5 nm, solid content of silver fine particles: 7%) was dropped, as the conductive fine particle dispersion solution in which the conductive fine particles 6 were dispersed in a solvent, on the insulating fine particle-containing binder component layer I obtained in the same manner as in Example 2-1, the electron acceleration layer 1004 was formed by spin coating at 3000 rpm for 10 s.

Then, on a surface of the electron acceleration layer 1004, the thin-film electrode 3 was formed by using a magnetron sputtering device, and thereby the electron emitting element of Example 2-2 was obtained. Gold was used as a material for forming the thin-film electrode 3. A thickness of the thin-film electrode 3 was 40 nm and an area thereof was 0.014 $cm^2$.

The electron emitting element of Example 2-2 was placed in vacuum at $1 \times 10^{-8}$ ATM. When an applied voltage V1 of 28.9 V was applied to the thin-film electrode 3 and an applied voltage V2 of 100 V was applied to the counter electrode, an electron emission current per unit area of 0.40 $mA/cm^2$ and a current in element of 38 $mA/cm^2$ were observed and an electron emission efficiency was 1.1%. Further, in a TEM photograph of the electron emitting element of Example 2-2, it was found that the conductive fine particles 6 were dispersed in large numbers on a side of the thin-film electrode 3 in the electron acceleration layer 1004.

Example 2-3

A silver nanoparticle-containing hexane dispersion solution (manufactured by Applied Nano Particle Laboratory Co., average particle diameter of silver fine particles: 4.5 nm, solid content of silver fine particles: 7%) was sprayed, as the conductive fine particle dispersion solution in which the conductive fine particles 6 were dispersed in a solvent, by the electrostatic spray method on the insulating fine particle-containing binder component layer I obtained in the same manner as in Example 2-1. As a result, the electron acceleration layer 1004 was formed. Conditions of the electrostatic spray were a flow rate of liquid: 2 μm/min, an internal diameter of syringe: 0.41 nm, a distance from a needle to the substrate: 8 cm, and a voltage: 5V.

Then, on a surface of the electron acceleration layer 1004 formed as described above, the thin-film electrode 3 was formed by using a magnetron sputtering device, and thereby the electron emitting element of Example 2-3 was obtained. Gold was used as a material for forming the thin-film electrode 3. A thickness of the thin-film electrode 3 was 40 nm and an area thereof was 0.014 $cm^2$.

The electron emitting element of Example 2-3 was placed in vacuum at $1 \times 10^{-8}$ ATM. When an applied voltage V1 of 23.4 V was applied to the thin-film electrode 3 and an applied voltage V2 of 100 V was applied to the counter electrode, an electron emission current per unit area of 0.10 $mA/cm^2$ and a current in element of 25 $mA/cm^2$ were observed, and an electron emission efficiency was 0.4%. Further, in a TEM photograph of the electron emitting element of Example 2-3, it was found that the conductive fine particles 6 were dispersed in large numbers on a side of the thin-film electrode 3 in the electron acceleration layer 1004.

Example 2-4

A silver nanoparticle-containing tetradecane dispersion solution (manufactured by ULVAC Materials, Inc., average particle diameter of silver fine particles: 5.0 nm, solid content of silver fine particles: 54%) was discharged and applied, as the conductive fine particle dispersion solution in which the conductive fine particles 6 were dispersed in a solvent, by using an ink-jet head onto the insulating fine particle-containing binder component layer I obtained in the same manner as in Example 2-1. As a result, the electron acceleration layer 1004 was formed. Conditions of the discharge were a discharge volume: 4 pL, a discharge pitch: 140 μm×240 μm, and a diameter of landing droplets: 30 μm.

Then, on a surface of the electron acceleration layer 1004, the thin-film electrode 3 was formed by using a magnetron sputtering device, and thereby the electron emitting element of Example 2-4 was obtained. Gold was used as a material for forming the thin-film electrode 3. A thickness of the thin-film electrode 3 was 40 nm and an area thereof was 0.0707 $cm^2$. In the area of 0.0707 $cm^2$, there were 210 landed droplets of the conductive fine particles and a total landing area of the droplets was $1.5^{-3}$ $cm^2$.

The electron emitting element of Example 2-4 was placed in vacuum at $1 \times 10^{-8}$ ATM. When an applied voltage V1 of 19.7 V was applied to the thin-film electrode 3 and an applied voltage V2 of 100 V was applied to the counter electrode, an electron emission current per unit area of 1.14 $mA/cm^2$ and a current in element of 734 $mA/cm^2$ were observed, and an electron emission efficiency was 0.2%. Further, in a TEM photograph of the electron emitting element of Example 2-4, it was found that the conductive fine particles 6 were dispersed in large numbers on a side of the thin-film electrode 3 in the electron acceleration layer 1004.

Comparative Example 2-1

The insulating fine particle-containing binder component dispersion solution A obtained in the same manner as in Example 2-1 was mixed with a conductive fine particle dispersion solution in which the conductive fine particles 6 was dispersed in a solvent. This conductive fine particle dispersion solution used in the present comparative example was a silver nanoparticle-containing hexane dispersion solution (manufactured by Applied Nano Particle Laboratory Co., average particle diameter of silver fine particles: 4.5 nm, solid content of silver fine particles: 7%). To 1.0 g of the insulating fine particle-containing binder component dispersion solution A, 1.0 g of the silver nanoparticle-containing hexane dispersion solution was added, and the solutions were stirred at a normal temperature so that insulating fine particle and conductive fine particle mixture solution B was obtained. A content of the conductive fine particles 6 in the mixture solution B was 3.5% by weight.

After the mixture solution B obtained as described above was dropped on a 30 mm square SUS substrate as the electrode substrate 2, an insulating fine particle and conductive fine particle-containing binder component was deposited by spin coating at 8000 rpm for 10 s. As a result, the electron acceleration layer 1004 was obtained.

Then, on a surface of the electron acceleration layer 1004, the thin-film electrode 3 was formed by using a magnetron sputtering device, and thereby the electron emitting element of Comparative Example 2-1 was obtained. Gold was used as a material for forming the thin-film electrode 3. A thickness of the thin-film electrode 3 was 30 nm and an area thereof was 0.014 $cm^2$. The electron emitting element of Comparative Example 2-1 was set up in vacuum at $1 \times 10^{-8}$ ATM. When an applied voltage V1 of 27.1 V was applied to the thin-film electrode 3 and an applied voltage V2 of 100 V was applied to the counter electrode, an electron emission current per unit area of 0.063 $mA/cm^2$ and a current in element of 118 $mA/cm^2$ were observed, and an electron emission efficiency was 0.05%. In the electron acceleration layer 1004 of Comparative Example 2-1, the conductive fine particles were evenly dispersed.

It is clear from Example 2-2 and Comparative Example 2-1 that addition of the conductive fine particles after formation of the binder component layer causes the conductive fine particles 6 to be dispersed in large numbers on a side of the thin-film electrode 3 in the electron acceleration layer 1004 and the electron emission efficiency of the electron emitting element improves.

Embodiment 3

Figure 13:
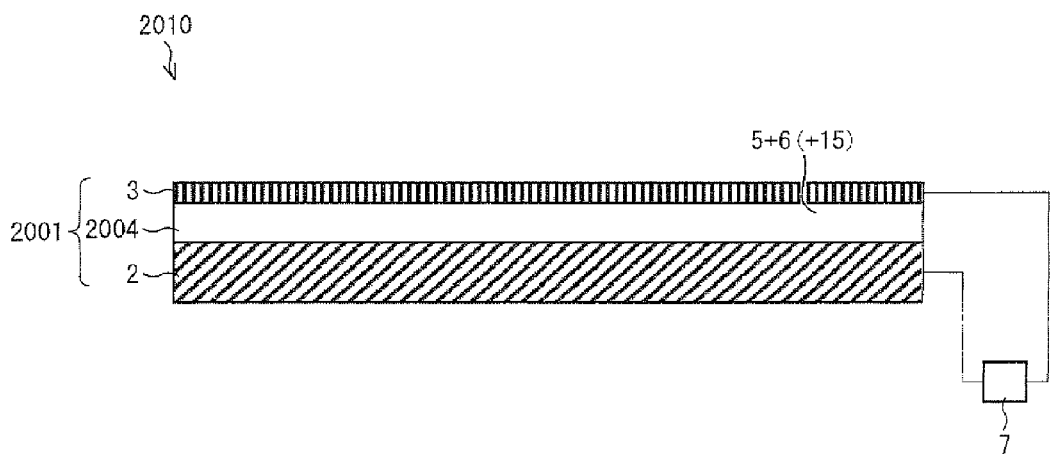
FIG. 13 is a schematic view illustrating a configuration of an electron emitting device including an electron emitting element of Embodiment 3 of the present invention.

FIG. 13 is a schematic view illustrating still another embodiment of an electron emitting device including an electron emitting element of the present invention. As illustrated in FIG. 13, an electron emitting element 2001 of the present embodiment includes an electrode substrate 2 serving as a lower electrode, a thin-film electrode 3 serving as an upper electrode, and an electron acceleration layer 2004 sandwiched between the electrode substrate 2 and the thin-film electrode 3. Further, the electrode substrate 2 and the thin-film electrode 3 are connected to a power supply 7 so that a voltage can be applied between the electrode substrate 2 and the thin-film electrode 3 which are provided so as to face each other. The electron emitting element 2001 and the power supply 7 constitute an electron emitting device 2010.

Note that members that have identical functions to those of members described in Embodiment 1 are given the same reference signs, and the explanations thereof are omitted.

A film thickness of the thin-film electrode 3 is an important factor for efficiently emitting electrons from the electron emitting element 1 to the outside. The film thickness of the thin-film electrode 3 is preferably in a range of 10 nm to 100 nm. A maximum film thickness is 100 nm, for emitting electrons from the electron emitting element 2001 to the outside. In a case where the film thickness is more than 100 nm, ballistic electrons do not pass thorough the thin-film electrode 3. In such a case, the ballistic electrons are absorbed by the thin-film electrode 3, or the ballistic electrons are reflected back by the thin-film electrode 3 and recaptured in the electron acceleration layer 4.

As shown in FIG. 13, in the electron acceleration layer 2004, conductive fine particles 6 and insulating fine particles 5 are dispersed. Further, the electron acceleration layer 2004 may include a binder component 15.

The electron acceleration layer 2004 may be made of a fine particle layer including the insulating fine particles 5 and arranged such that the conductive fine particles 6 are discretely provided at least on a surface of the fine particle layer. The fine particle layer here may include the conductive fine particles 6 in addition to the insulating fine particles 5. In a case where the fine particle layer includes the conductive fine particles 6, electric conductivity of surfaces of the insulating fine particles 5 can be changed by the conductive fine particles 6. This makes it easy to control electric conductivity of the element.

A ratio by weight of the insulating fine particles 5 in all the fine particles constituting the electron acceleration layer 2004 is preferably in a range of 80% to 95%.

In a case where an average particle diameter of the insulating fine particles 5 is larger than an average particle diameter of the conductive fine particles 6, it is possible to efficiently dissipate Joule heat that occurs at the time when current flows inside the element. This dissipation of Joule heat is carried out by efficiently conducting heat from the inside of the conductive fine particles 6 to the outside of the conductive fine particles 6 that are smaller in size than the insulating fine particles 5. This makes it possible to prevent the electron emitting element from being broken down by heat. Further, this also makes it possible to easily control a resistance value of the electron acceleration layer 2004.

Further, in a case where, as described later, the conductive fine particles 6 are applied by an ink-jet method on the fine particle layer containing the insulating fine particles 5 so that the electron acceleration layer 2004 is formed, a degree of permeation of the conductive fine particles 6 into the fine particle layer depends on, for example, a kind and/or an average particle diameter of the insulating fine particles 5, a kind and/or an average particle diameter of the conductive fine particles 6, and/or a combination of the insulating fine particles 5 and the conductive fine particles 6. In other words, in a case where the average particle diameter of the insulating fine particles 5 is small, most of the conductive fine particles 6 that are applied do not permeate inside the fine particle layer but are accumulated on the layer. Meanwhile, in a case where the average particle diameter of the insulating fine particles 5 is large, a gap between particles in the fine particle layer becomes so large that an amount of the conductive fine particles 6 staying in the fine particle layer becomes small. Therefore, for controlling the degree of permeation of the conductive fine particles into the fine particle layer in a case where the conductive fine particles 6 having an average particle diameter of 3 am to 10 nm are used, the average particle diameter of the insulating fine particles 5 is preferably in a range of 10 nm to 500 nm.

In a case where the electron acceleration layer 2004 includes the binder component 15 as described later, most of the conductive fine particles that have the average particle diameter in the range of 3 nm to 10 nm and that are applied do not stay on a layer of the binder component 15 including the insulating fine particles 5 if the average particle diameter of the insulating fine particles 5 is larger than 200 nm. Therefore, in a case where the electron acceleration layer 2004 includes the binder component 15 and employs the conductive fine particles 6 having the average particle diameter of 3 nm to 10 nm, the average particle diameter of the insulating fine particles 5 is preferably in a range of 10 nm to 200 nm.

For improving dispersibility of the conductive fine particles 6 at the time when a conductive fine particle dispersion solution is produced by a production method described later, it is preferable that a surface treatment is performed on the conductive fine particles 6. This surface treatment may be coating the conductive fine particles 6 with an insulating coating material.

Further, the electron acceleration layer 2004 may include the binder component 15. This binder component 15 may be made of resin described in Embodiment 1.

A dispersion state of the insulating fine particles 5 is kept in the fine particle layer including the binder component 15. Accordingly, even if the conductive fine particle dispersion solution is applied by using the ink-jet method as described later, the dispersion state of the insulating fine particles 5 in the fine particle layer will not change. Therefore, it becomes possible to form the electron acceleration layer 2004 whose electron emitting section is controlled to be provided more evenly. As a result, it is possible to produce the electron emitting element 2001 capable of steadily and sufficiently emitting electrons. In addition, because the binder component has a high adhesiveness with respect to the electrode substrate, mechanical strength of the element can be improved.

In a case where the electron acceleration layer 2004 is made of a fine particle layer including the insulating fine particles 5 and arranged such that the conductive fine particles 6 are discretely provided at least on the surface of the fine particle layer, a position where the conductive fine particles are provided becomes an electron emitting section. Therefore, the electron emitting element 2001 has an arrangement in which the electron emitting section is patterned. Accordingly, the position of the electron emitting section can be controlled. This can prevent a phenomenon in which a constituent material of the thin-film electrode 3 formed on the electron acceleration layer 2004 is worn out due to electrons emitted. It also becomes possible to control an amount of electrons emitted per unit area.

The element in which the conductive fine particles are discretely provided on the surface of the fine particle layer is produced as described later by applying the conductive fine particle dispersion solution by use of the ink-jet method after formation of the fine particle layer, for example. In such a case, because a dispersion state of the insulating fine particles in the fine particle layer including the binder component is kept in the production of the element, the dispersion state of the insulating fine particles in the fine particle layer will not change even if the conductive fine particle dispersion solution is subsequently applied. This results in formation of the electron acceleration layer in which controllability of an electron emitting position is improved. As a result, it becomes possible to produce an electron emitting element capable of steadily and sufficiently emitting electrons.

In a case where the conductive fine particles are present inside the electron acceleration layer 2004, the conductive fine particles 6 are present only below landing positions of the conductive fine particles on the surface of the fine particle layer. That is, a discrete state of the conductive fine particles is kept even inside the electron acceleration layer 2004.

Note that, when the conductive fine particles are to be discretely provided on the surface of the fine particle layer, inclusion of the binder component in the fine particle layer becomes one factor for controlling the degree of permeation of the conductive fine particles into the fine particle layer. However, another method may be used for discretely providing the conductive fine particles. Examples of a possible method for discretely providing the conductive fine particles are: (i) to apply, from above a fine particle layer in which insulating fine particles whose diameter is small are closely packed, conductive fine particles whose diameter is not much different from that of insulating fine particles; (ii) to apply conductive fine particles from above a fine particle layer, after formation of the fine particle layer by using an insulating fine particle dispersion solution having a relatively high viscosity; and (iii) to control a drying speed of a conductive fine particle dispersion solution.

The most part of the electron acceleration layer 2004 is made of a fine particle layer including the insulating fine particles 5. The conductive fine particles 6 are present only on, or on and inside the fine particle layer. The electron acceleration layer 2004 is a layer including the insulating fine particles 5 and the small number of conductive fine particles 6. This electron acceleration layer 2004 has a semiconductive property. In a case where the electron acceleration layer 2004 includes the binder component, most of the electron acceleration layer 2004 is made of a fine particle layer including the insulating fine particles 5 and the binder component. The conductive fine particles 6 are present only on, or on and inside the fine particle layer. The electron acceleration layer 2004 includes the small number of conductive fine particles 6 and the fine particle layer that includes the insulating fine particles 5 and the binder component. This electron acceleration layer 2004 has a semiconductive property. The same electron emission principle as in Embodiment 1 applies to the above electron acceleration layers 2004.

Regarding a case where all of the conductive fine particles 6 are discretely provided on a surface of the fine particle layer made of the insulating fine particles in the electron acceleration layer 2004, an electron emission mechanism of the electron emission element has not been clearly explained. However, the electron emission mechanism of the electron emission element is considered to be the following mechanism. That is, when a voltage is applied between the electrode substrate 2 and the thin-film electrode 3, electrons move onto surfaces of the insulating fine particles 5 from the electrode substrate 2. Because an inside of the insulating fine particles 5 has a high resistance, the electrons are conducted on the surfaces of the insulating fine particles 5. At the time of the electron conduction, the electrons are trapped in an impurity and/or a surface treating agent on the surface of the insulating fine particles 5, or at a contact between the insulating fine particles 5. The electrons trapped work as fixed electric charge. As a result, an intense electric field is produced on the surface of the electron acceleration layer 2004 due to a combination of electric fields formed by an applied voltage and the electrons trapped. Due to the intense electric field, the electrons are accelerated. Consequently, the electrons are caused to pass through the conductive fine particles (electron emitting section) that are discretely provided and the electrons are emitted from the thin-film electrode 3.

The following explanation deals with a method for forming the electron emitting element 2001 of the present invention.

Firstly, an insulating fine particle dispersion solution in which the insulating fine particles 5 are dispersed in a dispersion solvent is obtained. For example, the insulating fine particle dispersion solution can be obtained by dispersing, in a dispersion solvent, the insulating fine particles 5. A dispersion method is not specifically limited. For example, the dispersion by use of an ultrasonic dispersion device at a normal temperature can be performed. The dispersion solvent used here is not specifically limited as long as the insulating fine particles 5 can be dispersed in the dispersion solvent and can be dried after application of the dispersion solution. Examples of the dispersion solvent are toluene, benzene, hexane, methanol, and ethanol. The dispersion solvent suitable for dispersion changes depending on a kind of the insulating fine particles 5. For example, in a case where the insulating fine particles 5 are made of $SiO_2$, methanol or ethanol is suitable. The above dispersion solvents may be used solely or in combination of two or more kinds.

In a case where the electron acceleration layer 2004 includes a binder component, an insulating fine particle-containing binder component dispersion solution in which the insulating fine particles 5 and the binder component are dispersed in a dispersion solvent is obtained. The dispersion solvent used here is not specifically limited as long as the insulating fine particles 5 and the binder component can be dispersed in the dispersion solvent and dried after application of the dispersion solution. Examples of the dispersion solvent are: methanol, ethanol, propanol, 2-propanol, butanol, and 2-butanol. These dispersion solvents can be used solely or in combination of two or more kinds. A dispersion method is not specifically limited. For example, dispersion by use of an ultrasonic dispersion device at a normal temperature can be performed. A content of the insulating fine particles are preferably in a range of 1% by weight to 50% by weight. In a case where the content is less than 1% by weight, the insulating fine particles do not serve as an insulator that provides an effect of controlling a resistance of the electron acceleration layer 2004. Meanwhile, in a case where the content is more than 50% by weight, aggregation of the insulating fine particles 5 occurs. The content is more preferably in a range of 1% by weight to 20% by weight, in particular.

Then, the conductive fine particles 6 are dispersed in a dispersion solvent so as to give conductive fine particle dispersion solution. For example, the dispersion solution used here may be a dispersion solution in which the conductive fine particles 6 are dispersed in the dispersion solvent or a commercially available dispersion solution. A dispersion method is not specifically limited. For example, dispersion by use of an ultrasonic dispersion device at a normal temperature can be performed. The dispersion solvent is not specifically limited in the present embodiment, as long as the conductive fine particles 6 can be dispersed in the dispersion solvent and can be dried after application of the dispersion solution. In a case where the conductive fine particles 6 have been surface treated for improving dispersibility, a dispersion solvent suitable for dispersion should be used depending on a method of the surface treatment. For example, toluene or hexane is preferably used in the case of the conductive fine particles 6 whose surface is treated with alcoholate.

The conductive fine particle dispersion solution may be a liquid nano-colloidal solution of the conductive fine particles 6. When the liquid nano-colloidal solution of the conductive fine particles 6 is used, the dispersion solution in which the conductive fine particles 6 are not aggregated but evenly dispersed can be applied. Accordingly, it becomes possible to form, on the fine particle layer, the electron acceleration layer 2004 in which the conductive fine particles 6 are provided more evenly so that the electron emitting element 2001 capable of steadily and sufficiently emitting electrons can be produced. Note that the conductive fine particles 6 in a colloid, state preferably have an average particle diameter of 0.35 µm or less. By using such conductive fine particles that have the average particle diameter of 0.35 µm or less in a colloid state, dispersibility of the conductive fine particles in the electron acceleration layer 2004 can be improved as described later. Examples of the nano-colloidal solution of the conductive fine particles 6 are a gold nanoparticle colloidal solution fabricated and marketed by Harima Chemicals, Inc., silver nanoparticles fabricated and marketed by Applied Nano Particle Laboratory Co., a platinum nanoparticle colloidal solution and a palladium nano-particle colloidal solution fabricated and marketed by Tokuriki Chemicals Research Co., Ltd., and nickel nanoparticle paste fabricated and marketed by IOX K.K. A solvent of the nano-colloidal solution of the conductive fine particles 6 is not specifically limited as long as colloidal dispersion of the conductive fine particles 6 is possible and the conductive fine particles 6 can be dried after application of the nano-colloidal solution. Examples of the solvent are toluene, benzene, xylene, hexane, and tetradecane.

Then, the insulating fine particle dispersion solution or the insulating fine particle-containing hinder component dispersion solution prepared as described above is applied on the electrode substrate 2 so that a layer (fine particle layer) of the insulting fine particles 5 is obtained (the step of forming a fine particle layer). This application of the dispersion solution may be carried out by using, for example, a spin coating method. When the spin coating method is used for forming the fine particle layer, conditions of the spin coating are not specifically limited. However, the number of spins is preferably in a range of 1000 rpm to less than 10000 rpm, and, in particular, preferably in a range of 3000 rpm to less than 8500 rpm. When the fine particle layer is formed under the condition, the fine particle layer has an appropriate film thickness. Further, it becomes possible to make the film thickness of the electron acceleration layer even and to control a resistance of the electron acceleration layer in a layer thickness direction. As a result, the electrons can be emitted uniformly all over a surface of the electron emitting element. Further, the electrons can be efficiently emitted to the outside of the element.

Subsequently, the conductive fine particle dispersion solution fabricated as described above is applied on the fine particle layer (the step of applying the conductive fine particles). If the fine particle layer dries at a normal temperature and does not change over time, application of the conductive fine particle dispersion solution can be performed immediately after the drying.

The application of the conductive fine particle dispersion solution is carried out by an ink-jet method. Conditions in a case where the ink-jet method is used are not specifically limited. However, a discharge volume is preferably in a range of 0.1 fL to less than 100 pL and, in particular, preferably in a range of 1.0 pL to less than 10 pL. A degree of permeation of the conductive fine particles into the fine particle layer depends on a discharge volume of the conductive fine particle dispersion solution in addition to a kind and/or an average particle diameter of the insulating fine particles and a kind and/or an average particle diameter of the conductive fine particles, a combination of the insulating fine particles and the conductive fine particles, and/or the like. In other words, in a case where the discharge volume is too small, only a small amount of conductive fine particles permeate the fine particle layer because droplets are small. As a result, most of the conductive fine particles applied do not permeate inside the fine particle layer including the insulating fine particles 5 but accumulate on the fine particle layer. Meanwhile, in a case where the discharge volume is large, too many conductive fine particles remain on the fine particle layer and a conductive layer is formed between the electron acceleration layer and the thin-film electrode. As a result, because accelerated electrodes are scattered, an amount of electrons emitted decreases. Further, because a large amount of conductive fine particles permeate the fine particle layer, a conductive pass is easily formed and a large current flows in the element at a low voltage. As a result, an amount of electrons emitted decreases.

As described above, the insulating fine particle dispersion solution and the conductive fine particle dispersion solution are prepared separately. Then, the dispersion solution including the conductive fine particles is applied on the fine particle layer including the insulating fine particles 5 by the ink-jet method so that the electron acceleration layer 2004 is formed.

In this way, the electron acceleration layer 2004 is formed. After the formation of the electron acceleration layer 2004, the thin-film electrode 3 is formed on the electron acceleration layer 2004. For formation of the thin-film electrode 3, for example, a magnetron sputtering method may be used. Alternatively, the thin-film electrode 3 may be formed by using, for example, an ink-jet method, a spin coating method, or a vapor deposition method.

In the present embodiment, the electron emitting element 2001 should have a semiconductive property that allows electrons to become ballistic electrons in the electron acceleration layer 2004 and to be emitted. However, the amount of the electrons emitted from the electron emitting element 2001 does not need to increase in proportion to an amount of the conductive fine particles 6 in the electron acceleration layer 2004. Therefore, an amount of the conductive fine particles necessary in the electron acceleration layer 2004 is small. Meanwhile, for obtaining an element having uniform performance, the electron emitting section that is a region into which the conductive fine particles are introduced should not be distributed unevenly. Accordingly, for producing the element, it is required (i) to select a dispersion solvent having a suitable dispersibility for each fine particle, (ii) to apply evenly a small amount of the conductive fine particle dispersion solution on the fine particle layer including the insulating fine particles, and (iii) to distribute evenly the conductive fine particles in the region into which the conductive fine particles are introduced on, or inside, or on and inside the fine particle layer. Further, for patterning the electron acceleration section, it is necessary to control whether or not the conductive fine particles are present on the fine particle layer.

According to the above production method, in the step of forming the electron acceleration layer 2004, the fine particle layer including the insulating fine particles 5 is formed and the conductive fine particle dispersion solution is applied by using the ink-jet method onto the fine particle layer. This method makes it possible to evenly provide a small amount of the conductive fine particles 6 in a desired area in a region into which the conductive fine particles are introduced on, or inside, or on and inside the fine particle layer. As a result, it becomes possible to produce the electron emitting element 2001 in which the electron emitting section is evenly provided and which is capable of steadily and sufficiently emitting electrons.

Further, according to the above production method, the insulating fine particle dispersion solution and the conductive fine particle dispersion solution are prepared separately, and individually applied on the electrode substrate. This prevents an aggregate from being produced at the time when the insulating fine particle dispersion solution and the conductive fine particle dispersion solution are mixed. Further, it also becomes possible to prevent a problem of aggregate production at the time when the conductive fine particles are added to the insulating fine particle dispersion solution.

Accordingly, by applying the conductive fine particle dispersion solution after the fine particle layer is formed by applying the insulating fine particle dispersion solution onto the electrode substrate 2, it becomes possible to form the electron acceleration layer that has less aggregates of the fine particles and controlled conductivity. Moreover, by an easy production process in which the fine particle dispersion solution is applied, the electron emitting element 2001 can be obtained easily at low cost.

In this way, according to the method of the present invention, the occurrence of the aggregate of the fine particles can be prevented. Accordingly, it becomes possible to form, simply at low cost, the electron acceleration layer in which the electron emitting section is evenly provided in the region into which the conductive fine particles 6 are introduced on, or inside, or on and inside the fine particle layer including the evenly dispersed insulating fine particles 5. As a result, it becomes possible to produce the electron emitting element 2001 capable of emitting a steady and sufficient amount of electrons. Furthermore, according to the above method, the ink-jet method is used when the conductive fine particles are applied to the fine particle layer. Therefore, a discharge amount and a discharge position of the conductive fine particles 6 can be controlled. As a result of controlling the discharge position of the conductive fine particles 6, the electron emitting section that emits a steady and sufficient amount of electrons can be freely patterned in the electron acceleration layer 2004 by using a small amount of material. Therefore, the electron emitting element 2001 of the present invention is suitable for application to an image display device such as a flat panel display.

In a case where the conductive fine particles are applied after the fine particle layer including a binder component is formed by using an insulating fine particle-containing binder component dispersion solution, a dispersion state of the insulating fine particles is maintained in the fine particle layer including the binder component. Accordingly, even when the conductive fine particle dispersion solution is applied by using the ink-jet method, the dispersion state of the insulating fine particles in the fine particle layer does not change. This makes it possible to form the electron acceleration layer in which the electron emitting section is controlled to be more evenly provided and thereby to produce the electron emitting element capable of steadily and sufficiently emitting electrons.

Further, according to the above production method, the dispersion solutions of the insulating fine particles 5 and the conductive fine particles 6 are not mixed. The conductive fine particle dispersion solution is applied after the fine particle layer including the insulating fine particles is formed by applying the insulating fine particle dispersion solution. Accordingly, even when the dispersion solvent in which the insulating fine particles 5 are easily dispersed is different from the dispersion solvent in which the conductive fine particles 6 are easily dispersed, the electron acceleration layer can be formed while dispersibility of each of the insulating fine particles 5 and the conductive fine particles 6 is maintained. In other words, even when the dispersion solvent in which the insulating fine particles 5 are highly dispersible is different from the dispersion solvent in which the conductive fine particles 6 are highly dispersible, it is possible to form a uniform electron acceleration layer that includes none of an aggregate of the insulating fine particles 5, an aggregate of the conductive fine particles 6, and an aggregate of the insulating fine particles 5 and the conductive fine particles 6.

Note that, in the ink-jet method, conductive ink for fine wiring can be used as the conductive fine particles 6. Example of a solvent included in such conductive ink are: tetradecane, decane, decanol, toluene, hexane, and xylene.

Example 3

The following explains an experiment in which current measurement was carried out by use of electron emitting elements according to Embodiment 3. Note that this experiment is merely an example of the present embodiment and by no means limits the present invention.

First, electron emitting elements of Examples 3-1 and 3-2 and Comparative Examples 3-1 and 3-2 were produced as described below. Then, an experiment was carried out on these electron emitting elements. In the experiment, electron emission current per unit area was measured as in Example 1.

The present example employs an experiment system using the electron emitting element 2001 as shown in FIG. 13 in place of an electron emitting element 1 in an experiment system as shown in FIG. 3. The experiment system was set up in vacuum at $1 \times 10^{-8}$ ATM and an electron emission experiment was carried out. In the experiment, a distance via the insulating spacer 9 between the electron emitting element and the counter electrode was set to 5 mm. Moreover, an applied voltage V2 to the counter electrode was set to 100V.

Example 3-1

First, 2.4 g of hexane as a dispersion solvent and 0.5 g of spherical fine particles having an average particle diameter of 110 nm as the insulating fine particles 5 were supplied into a 10 mL reagent bottle. This reagent bottle was then set in an ultrasonic dispersion device so that an insulating fine particle dispersion solution A was prepared. A content of the insulating fine particles in the insulating fine particle dispersion solution A was 17% by weight.

Next, a fine particle layer I was formed on the electrode substrate 2 by spinning the insulating fine particle dispersion solution A at 3000 rpm for 10 s according to a spin coating method and dried at a room temperature for an hour. On the fine particle layer obtained as described above, a gold nanoparticle-containing naphthene dispersion solution (manufactured by Harima Chemicals, Inc., average particle diameter of gold fine particles: 5.0 nm, solid content of gold fine particles: 52%) was applied. For the application of the gold nanoparticle-containing naphthene dispersion solution, an ink-jet method was used. In other words, the gold nanoparticle-containing naphthene dispersion solution was applied by discharging this dispersion solution with the use of an ink-jet head. Discharge conditions for this application of the dispersion solution were a discharge volume: 4 pL and a discharge pitch: 140 μm×240 μm. Under the discharge conditions, a diameter of landing droplets was 30 μm.

After the gold nanoparticle-containing naphthene dispersion solution was applied by the ink-jet method on the fine particle layer I, the fine particle layer I on which the gold nanoparticle-containing naphthene dispersion solution was applied was left for 24 hours and naturally dried, so that the gold nanoparticles permeated the fine particle layer I. As a result, the electron acceleration layer 2004 was formed.

Subsequently, on a surface of the electron acceleration layer 2004, the thin-film electrode was formed by using a magnetron sputtering device, and thereby the electron emitting element of Example 3-1 was obtained. Gold was used as a material for forming the thin-film electrode. A thickness of the thin-film electrode 3 was 40 nm and an area thereof was 0.707 cm$^2$. In the area of 0.0707 cm$^2$, there were 210 landed droplets of the conductive fine particles and a total landing area of the droplets was $1.5 \times 10^{-3}$ cm$^2$.

The electron emitting element of Example 3-1 was placed in vacuum at $1 \times 10^{-8}$ ATM. When an applied voltage V1 of 39.9 V was applied to the thin-film electrode, an electron emission current per unit area of 0.869 mA/cm$^2$ and a current in element of 428 mA/cm$^2$ were observed, and an electron emission efficiency was 0.2%.

Example 3-2

First, 2.0 g of ethanol as a dispersion solvent and 0.5 g of methyltrimethoxysilane KBM-13 (manufactured by Shin-Etsu Chemical Co., Ltd.) as a binder component were supplied into a 10 mL reagent bottle, and then 0.5 g of spherical silica particles AEROSIL RX50 (manufactured by Evonik Degussa Japan Co., Ltd., average particle diameter: 40 nm) were added as the insulating fine particles. The reagent bottle was then set in an ultrasonic dispersion device so that an insulating fine particle-containing binder component dispersion solution B was prepared. A content of the insulating fine particles in the insulating fine particle-containing binder component dispersion solution B was 17% by weight.

Next, a fine particle layer II was formed on the electrode substrate 2 by spinning the insulating fine particle-containing binder component dispersion solution B at 3000 rpm for 10 s according to a spin coating method and dried at a room temperature for 24 hours. On the fine particle layer II obtained as described above, a silver nanoparticle-containing tetradecane dispersion solution (manufactured by ULVAC Materials, Inc., average particle diameter of silver fine particles: 5.0 nm, solid content of silver fine particles: 54%) was applied, as the conductive fine particle dispersion solution in which the conductive fine particles 6 were dispersed in a dispersion solvent. For this application of the silver nanoparticle-containing tetradecane dispersion solution, an ink-jet method was used. That is, the application was carried out by discharging the silver nanoparticle-containing tetradecane dispersion solution with the use of an ink-jet head. Conditions of the discharge were a discharge volume: 4 pL, and a discharge pitch: 140 μm×240 μm. Under the conditions, a diameter of landing droplets was 30

After the silver nanoparticle-containing tetradecane dispersion solution was applied onto the fine particle layer II by the ink-jet method, the fine particle layer II on which the silver nanoparticle-containing tetradecane dispersion solution was applied was left for an hour and naturally dried so that the silver nanoparticles permeate the fine particle layer II. As a result, the electron acceleration layer 2004 was formed.

Subsequently, on a surface of the electron acceleration layer 2004, the thin-film electrode was formed by using a magnetron sputtering device, and thereby the electron emitting element of Example 3-2 was obtained. Gold was used as a material for forming the thin-film electrode 3. A thickness of the thin-film electrode 3 was 40 nm and an area thereof was 0.0707 cm$^2$. In the area of 0.0707 cm$^2$, there were 210 landed droplets of the conductive fine particles and a total landing area of the droplets was $1.5 \times 10^{-3}$ cm$^2$.

The electron emitting element of Example 3-2 was placed in vacuum at $1 \times 10^{-8}$ ATM. When an applied voltage V1 of 19.7 V was applied to the thin-film electrode, an electron emission current per unit area of 1.14 mA/cm$^2$ and a current in element of 734 mA/cm$^2$ were observed, and an electron emission efficiency was 0.2%.

Comparative Example 3-1

After a silver nanoparticle-containing hexane dispersion solution (manufactured by Applied Nano Particle Laboratory Co., average particle diameter of silver fine particles: 4.5=, solid content of silver fine particles: 7%) was dropped, as the conductive fine particle dispersion solution in which the conductive fine particles 6 were dispersed in a dispersion solvent, on the fine particle layer II including a binder component in the same manner as in Example 3-2, the electron acceleration layer was formed by spin coating at 3000 rpm for 10 s. After the silver nanoparticle-containing hexane dispersion solution was applied by the spin coating method, the fine particle layer II on which the silver nanoparticle-containing hexane dispersion solution was applied was left for an hour and dried so that the silver nanoparticles were caused to permeate the fine particle layer II.

Then, on a surface of the electron acceleration layer, the thin-film electrode was formed by using a magnetron sputtering device, and thereby the electron emitting element of Comparative Example 3-1 was obtained. Gold was used as a material for forming the thin-film electrode. A thickness of the thin-film electrode 3 was 40 nm and an area thereof was 0.014 cm$^2$.

The electron emitting element of Comparative Example 3-1 was set up in vacuum at $1 \times 10^{-8}$ ATM. When an applied voltage V1 of 28.9 V was applied to the thin-film electrode 3, an electron emission current per unit area of 0.40 mA/cm$^2$ and a current in element of 38 mA/cm$^2$ were observed, and an electron emission efficiency was 1.1%.

Note that the values of the applied voltages described in the above Embodiments and Examples are values at which the electron emission current was the maximum. In other words, it is clear that electron emission at a low voltage is possible in the case of the electron emitting element produced by using the ink-jet method in application of the conductive fine particle dispersion solution.

In a case where the ink-jet method is used in application of the conductive fine particle dispersion solution, it is considered that current in element easily flows due to a short distance between the conductive fine particles because the conductive fine particles permeate the fine particle layer in a state where the conductive fine particles are hardly diffused. Meanwhile, in a case where the spin coating method is used, it is considered that the current in element is difficult to flow due to a long distance between the conductive fine particles and due to a large resistance produced by the insulating fine particles because, in the case of the spin coating method, the conductive fine particles penetrate the fine particle layer while being diffused.

Embodiment 4

Figure 4:
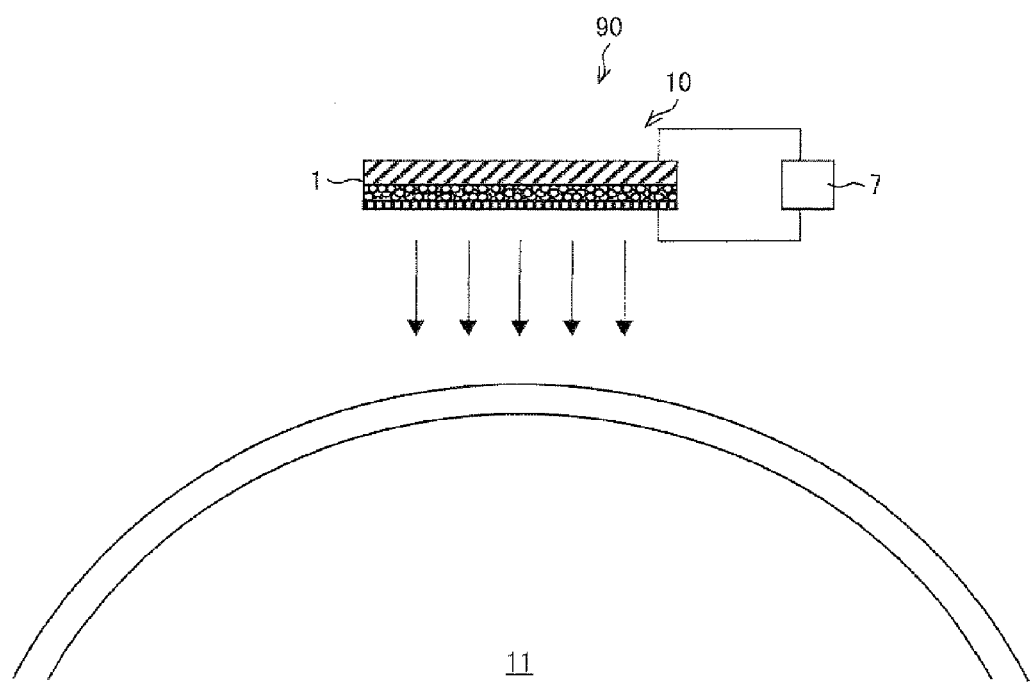
FIG. 4 is a diagram illustrating an example of a charging device including an electron emitting device of the present invention.

FIG. 4 shows an example of a charging device 90 of the present invention including an electron emitting device 10 including an electron emitting element 1 described in Embodiment 1.

Note that the charging device 90 of the present invention may employ an electron emitting device 1010 of Embodiment 2 or an electron emitting device 2010 of Embodiment 3. A drawing of the charging device employing the electron emitting device 2010 of Embodiment 3 is obtained from FIG. 4 by replacing the electron emitting element 1 of FIG. 4 with the electron emitting element 2001 as shown in FIG. 13.

The charging device 90 includes the electron emitting device 10 including the electron emitting element 1 and a power supply 7 for applying a voltage to the electron emitting element 1. The charging device 90 is used for electrically charging a photoreceptor 11. An image forming apparatus of the present invention includes the charging device 90. In the image forming apparatus of the present invention, the electron emitting element 1 in the charging device 90 is provided so as to face the photoreceptor 11 to be charged. Application of a voltage causes the electron emitting element 1 to emit electrons so that the photoreceptor 11 is electrically charged. In the image forming apparatus of the present invention, other than the charging device 90, known members can be used. The electron emitting element 1 in the charging device 90 is preferably provided so as to be, for example, 3 mm to 5 mm apart from the photoreceptor 11. Further, it is preferable that a voltage of approximately 25 V is applied to the electron emitting element 1. An electron acceleration layer of the electron emitting element 1 should be configured such that 1 μA/cm² of electrons are emitted per unit of time in response to application of a voltage of 25V, for example.

The electron emitting device 10 which is used as the charging device 90 does not cause electric discharge. Therefore, the charging device 90 generates no ozone. Ozone is harmful to human bodies, and therefore regulated in various environmental standards. Even if ozone is not discharged to the outside of the apparatus, ozone deteriorates by oxidation an organic material such as the photoreceptor 1 or a belt inside the apparatus. However, such a problem can be solved by that the electron emitting element 1 of the present invention is used in the charging device 90 and further the image forming apparatus includes such a charging device 90.

Further, the electron emitting device 10 serving as the charging device 90 is configured as a planar electron source. Therefore, the electron emitting device 10 is capable of charging the photoreceptor 11 on an area that has a width in a rotation direction. This provides many chances for charging a section of the photoreceptor 11. Therefore, the charging device 90 can perform a more uniform electric charging as compared to a wire charging device electrically charging line by line a section on the photoreceptor 11. Further, the charging device 90 has an advantage such that the applied voltage is approximately 10 V which is far lower than that of a corona discharge device which requires an applied voltage of a few kV.

Further, in a case where the electron emitting element 1 or the electron emitting element 1001 is used, an operation in the atmosphere becomes possible. In addition, in a case where the electron emitting element 1001 or the electron emitting element 2001 is used, efficiency of electron emission is high. Therefore, the charging device 90 can perform efficient charging.

Embodiment 5

Figure 5:
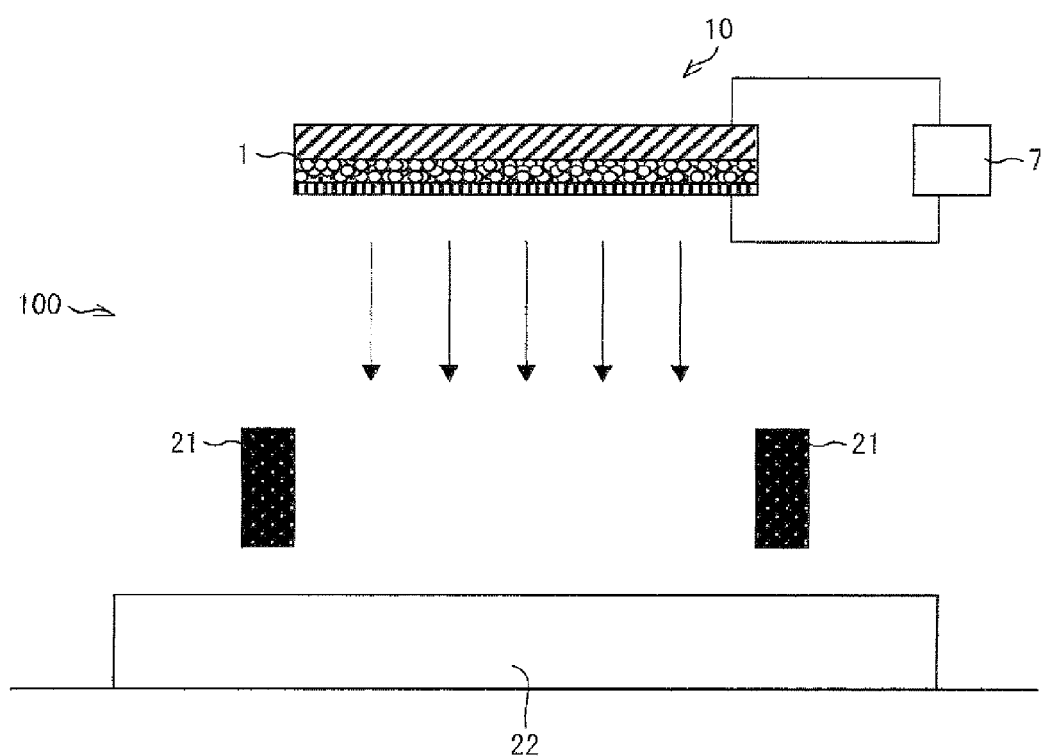
FIG. 5 is a diagram illustrating an example of an electron-beam curing device including an electron emitting device of the present invention.

FIG. 5 shows an example of an electron-beam curing device 100 of the present invention including an electron emitting device 10 employing an electron emitting element of the present invention which is described in Embodiment 1.

Note that the electron-beam curing device 100 of the present invention may employ an electron emitting device 1010 of Embodiment 2 or an electron emitting device 2010 of Embodiment 3. A drawing of the electron-beam curing device employing the electron emitting device 2010 of Embodiment 3 is obtained by replacing the electron emitting element 1 of FIG. 5 by the electron emitting element 2001 as shown in FIG. 13.

The electron-beam curing device 100 includes the electron emitting device 10 including the electron emitting element 1 and a power supply 7 for applying a voltage to the electron emitting element 1, and an accelerating electrode 21 for accelerating electrons. In the electron-beam curing device 100, the electron emitting element 1 serving as an electron source emits electrons, and the electrons emitted are accelerated by the accelerating electrode 21 so that the electrons collide with a resist (an object to be cured) 22. Energy necessary for curing the general resist 22 is not more than 10 eV. In terms of energy, the accelerating electrode is not necessary. However, a penetration depth of an electron beam is determined by a function of energy of electrons. For example, in order to entirely cure the resist 22 having a thickness of 1 μm, an accelerating voltage of approximately 5 kV is required.

In a conventional general electron-beam curing device, an electron source is sealed in vacuum and caused to emit electrons by application of a high voltage (in a range of 50 kV to 100 kV). The electrons are taken out through an electron window and used for irradiation. According to the above electron emission method, when the electrons pass through the electron window, loss of a large amount of energy occurs in the electrons. Further, the electrons that reach the resist pass through the resist in the thickness direction because the electrons have high energy. This decreases energy utilization efficiency. In addition, because an area on which electrons are thrown at a time is small and irradiation is performed in a manner drawing with dots, throughput is low.

On the other hand, the electron-beam curing device of the present invention including the electron emitting device 10 or electron emitting device 1010 can work in the atmosphere, so that the electron-beam curing device does not need to be sealed in vacuum. Further, the electron-beam curing device employing the electron emitting device 1010 can efficiently carry out irradiation of an electron beam because the electron emitting element 2001 has a high electron emission efficiency.

The electron-beam curing device 100 is free from energy loss because the electrons do not pass through the electron window. This allows reducing an applied voltage. Moreover, since the electron-beam curing device 100 has a planar electron source, the throughput increases significantly in a case where electrons are emitted in accordance with a pattern, it is possible to perform a maskless exposure.

Embodiment 6

Figure 6:
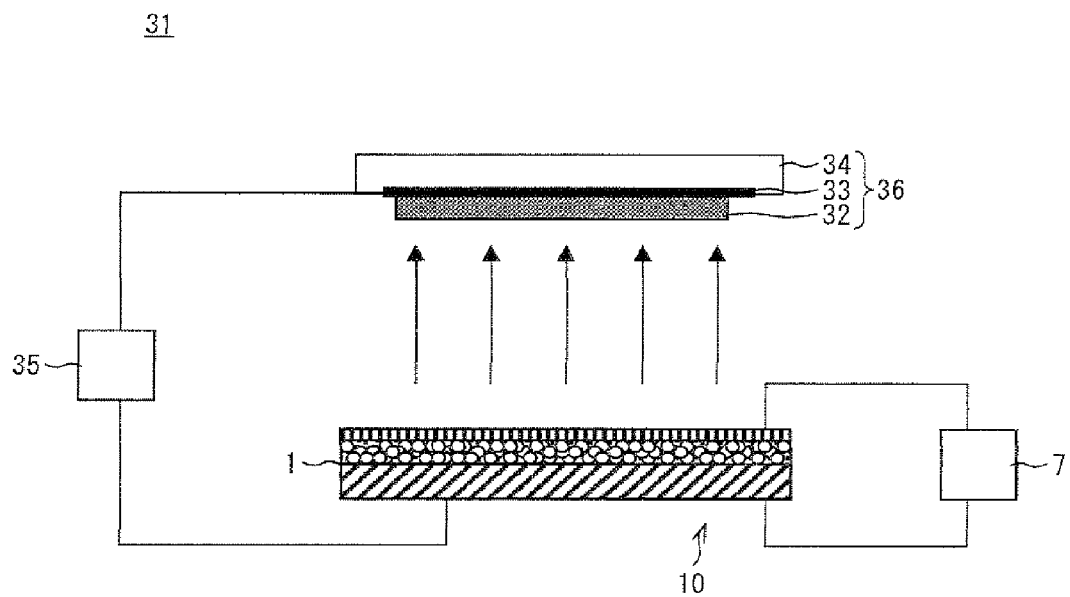
FIG. 6 is a diagram illustrating an example of a light emitting device including an electron emitting device of the present invention.
Figure 7:
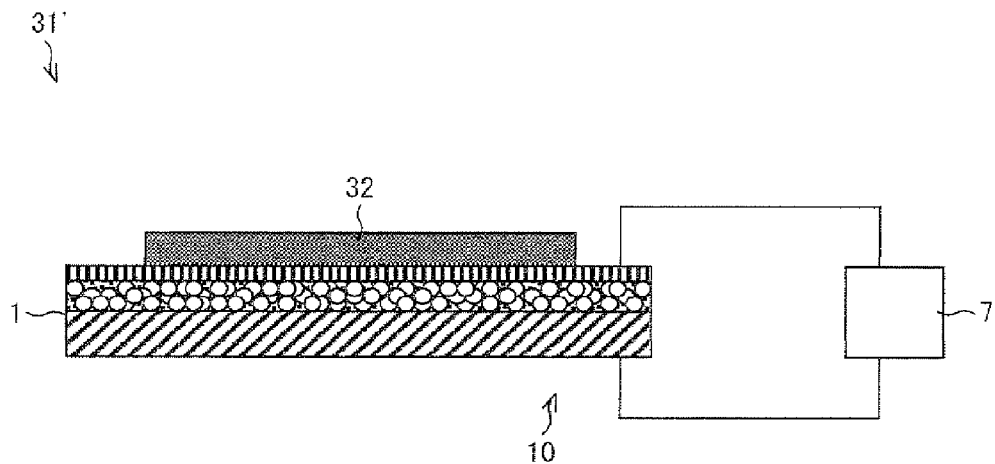
FIG. 7 is a diagram illustrating another example of a light emitting device including an electron emitting device of the present invention.
Figure 8:
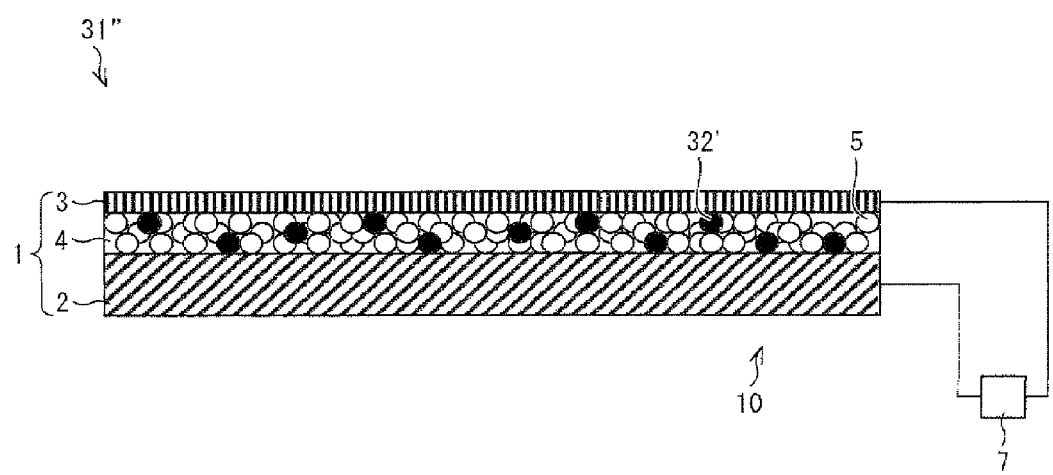
FIG. 8 is a diagram illustrating still another example of a light emitting device including an electron emitting device of the present invention.

FIG. 6 through FIG. 8 show examples of respective light emitting devices 31, 31' and 31" of the present invention each including an electron emitting device 10 including an electron emitting element 1 which is described in Embodiment 1.

Note that each of the light emitting devices 31, 31' and 31" of the present invention may employ an electron emitting device 1010 of Embodiment 2 or an electron emitting device 2010 of Embodiment 3. A drawing of each of the light emitting devices 31, 31' and 31" employing the electron emitting device 2010 of Embodiment 3 is obtained by replacing each of the electron emitting elements 1 of FIGS. 6 to 8 by the electron emitting element 2001 as shown in FIG. 13.

The light emitting device 31 illustrated in FIG. 6 includes the electron emitting device 10 including an electron emitting element 1 and a power supply 7 for applying a voltage to the electron emitting element 1, and a light-emitting section 36 having a laminated structure including a glass substrate 34 as a base material, an ITO film 33, and a luminous body 32. The light emitting section 36 is provided in a position that is apart from the electron emitting element 1 so that the luminous body 32 faces the electron emitting element 1.

Suitable materials of the luminous body 32 are materials that are excited by electrons and that correspond to red light emission, green light emission, and blue light emission, respectively. Examples usable as such materials corresponding to red are $Y_2O_3$:Eu, and (Y, Gd) $Bo_3$:Eu; examples usable as such materials corresponding to green are $Zn_2SiO_4$:Mn and $BaAl_{12}O_{19}$:Mn; and an example usable as such materials corresponding to blue is $BaMgAl_{10}O_{17}$:$Eu^{2+}$. A film of the luminous body 32 is formed on the ITO film 33 which is formed on the glass substrate 34. It is preferable that the luminous body 32 is approximately 1 μm in thickness. Further, the ITO film 33 may have any thickness as long as the ITO film 33 can reliably have electric conductivity at the thickness. In the present embodiment, the ITO film 33 is set to 150 nm in thickness.

For forming a film of the luminous body 32, a mixture of epoxy resin serving as a binder and luminous-body particles is prepared, and a film of the mixture may be formed by a known method such as a bar coater method or a dropping method.

In this embodiment, in order to increase a brightness of light emitted from the luminous body 32, it is necessary to accelerate, toward the luminous body, electrons which are emitted from the electron emitting element 1. Accordingly, between the electrode substrate 2 of the electron emitting element 1 and the ITO film 33 of the light-emitting section 36, a power supply 35 should be provided in order to form an electric field for accelerating the electrons. In this case, it is preferable that: (i) a distance between the luminous body 32 and the electron emitting element 1 is 0.3 mm to 1 mm; a voltage applied by the power supply 7 is 18V; and a voltage applied by the power supply 35 is 500 V to 2000 V.

A light emitting device 31' shown in FIG. 7 includes the electron emitting device 10 including an electron emitting element 1 and a power supply 7 for applying a voltage to the electron emitting element 1, and a luminous body 32. In the light emitting device 31', the luminous body 32 is a planar luminous body which is provided on a surface of the electron emitting element 1. In the present embodiment, a layer of the luminous body 32 is formed on a surface of the electron emitting element 1, in such a manner that a mixture of epoxy resin serving as a binder and luminous-body particles is prepared as described above and a film of the mixture is formed on the surface of the electron emitting element 1. Note that, because the electron emitting element 1 itself has a structure which is vulnerable to external force, the element may be damaged as a result of use of the bar coater method. Therefore, it is preferable to use the dropping method or the spin coating method.

The light emitting device 31" shown in FIG. 8 includes the electron emitting device 10 including an electron emitting element 1 and a power supply 7 for applying a voltage to the electron emitting element 1. Further, in a fine particle layer 4 of the electron emitting element 1, fluorescent fine particles as a luminous body 32' are mixed in. In this case, the luminous body 32' may be configured to also serve as the insulating fine particles 5. Generally, however, the luminous-body fine particles have a low electric resistance. As compared to electric resistance of the insulating fine particles 5, the electric resistance of the luminous-body fine particles is clearly lower. Therefore, when the luminous-body fine particles are mixed in replacement of the insulating fine particles 5, an amount of the luminous-body fine particles should be suppressed to a small amount. For example, when spherical silica particles (average particle diameter of 110 nm) is used as the insulating fine particles 5 and ZnS:Mg (average particle diameter of 500 nm) are used as the luminous-body fine particles, an appropriate mixture ratio by weight of the insulating fine particles 5 and the luminous-body fine particles is approximately 3:1.

In the above light emitting devices 31, 31', and 31", electrons emitted from the electron emitting device 10 are caused to collide with the corresponding fluorescent bodies 32 and 32' so that light is emitted.

Note that, because the electron emitting element 1 or the electron emitting element 1001 can emit electrons in the atmosphere, the light emitting devices 31, 31', and 31" employing the electron emitting device 10 or the electron emitting device 1010 can work in the atmosphere. However, sealed in vacuum, the light emitting devices 31, 31', and 31" can work more efficiently because an electron emission current increases.

In a case where the electron emitting device 2010 is used, the light emitting devices 31, 31', and 31" can efficiently emit light because the electron emitting element 2001 has a high electron emission efficiency.

Figure 9:
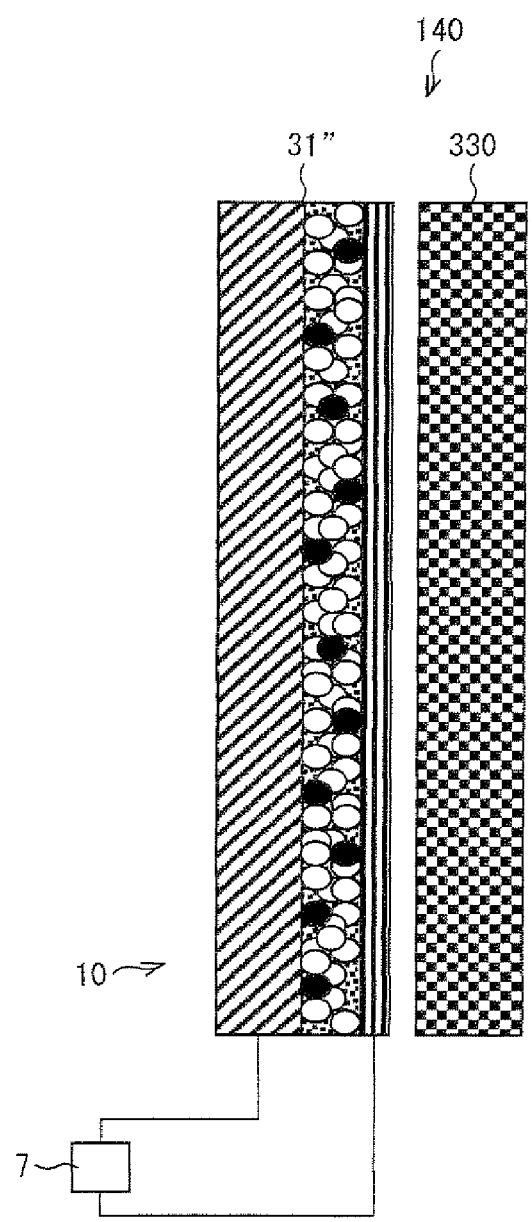
FIG. 9 is a diagram illustrating an example of an image display device which includes a light emitting device including an electron emitting device of the present invention.

FIG. 9 illustrates an example of an image display device of the present invention which includes a light emitting device of the present invention. An image display device 140 illustrated in FIG. 9 includes a light emitting device 31" illustrated in FIG. 8, and a liquid crystal panel 330. In the image display device 140, the light emitting device 31" is provided behind the crystal panel 330 and used as a backlight. In cases where the light emitting device 31" is used in the image display device 140, it is preferable that a voltage of 20 V to 35 V is applied to the light emitting device 31". The light emitting device 31" should be configured to emit, for example, 10 $\mu A/cm^2$ of electrons per unit of time at the voltage of 20 V to 35 V. Further, it is preferable that a distance between the light emitting device 31" and the liquid crystal panel 330 is approximately 0.1 mm.

In cases where light emitting devices 31 illustrated in FIG. 6 are used as an image display device of the present invention, the light emitting devices 31 may be arranged in a matrix so as to form a shape that allows the light emitting devices 31 themselves serving as an FED to form and display an image. In such cases, it is preferable that a voltage applied to the light emitting device 31 is in a range of 20 V to 35 V. The light emitting device 31 should be configured to emit, for example, 10 μA/cm² of electrons per unit of time, at the applied voltage in the range of 20 V to 35 V.

Embodiment 7

Figure 10:
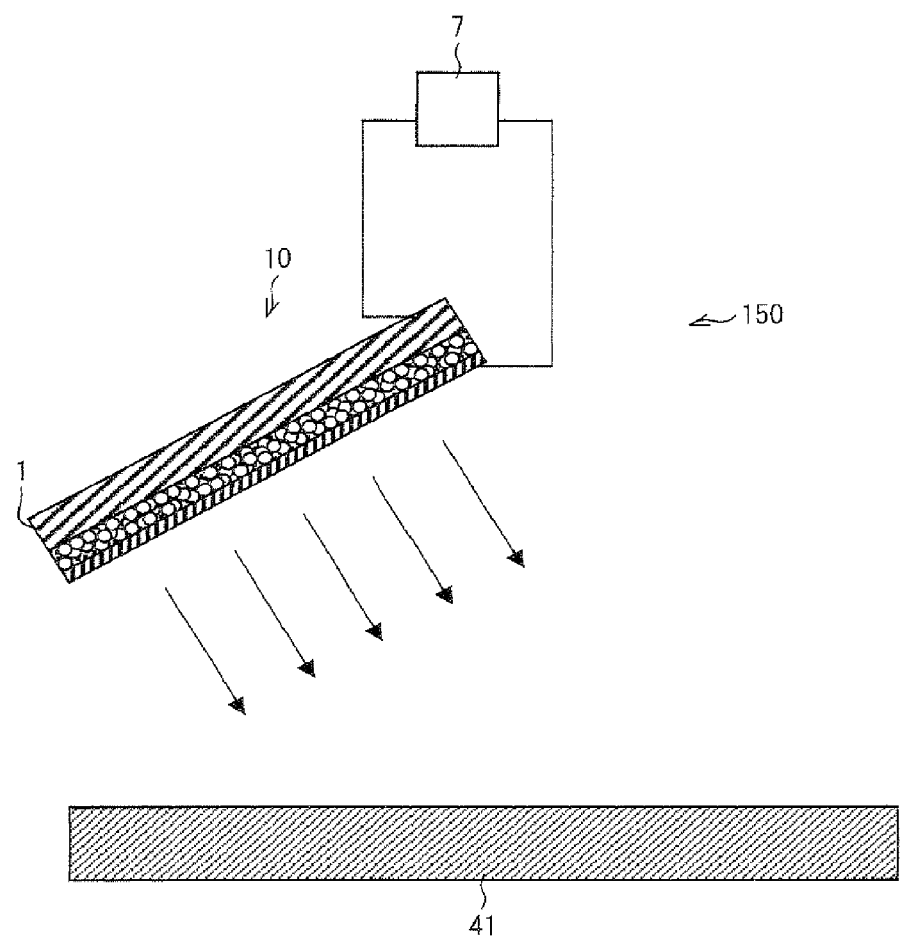
FIG. 10 is a diagram illustrating an example of an air blowing device including an electron emitting device of the present invention and a cooling device which includes the air blowing device.
Figure 11:
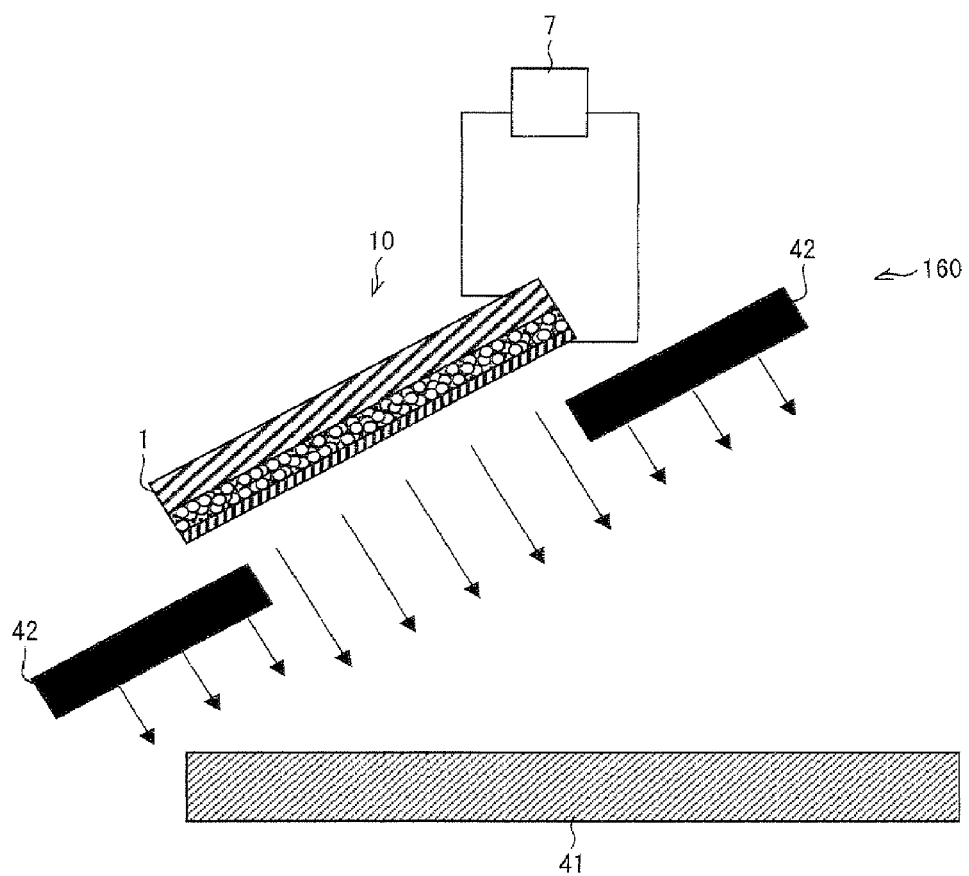
FIG. 11 is a diagram illustrating another example of an air blowing device including an electron emitting device of the present invention and a cooling device which includes the air blowing device.

FIG. 10 and FIG. 11 show examples of air blowing devices 150 and 160 of the present invention each including an electron emitting device 10 employing an electron emitting element 1 of the present invention described in Embodiment 1. The following explanation deals with a case where each of the air blowing devices of the present invention is used as a cooling device. However, application of the air blowing device is not limited to a cooling device.

Note that each of the air blowing devices 150 and 160 of the present invention may employ an electron emitting device 1010 of Embodiment 2 or an electron emitting device 2010 of Embodiment 3. A drawing of each of the air blowing devices 150 and 160 employing the electron emitting device 2010 of Embodiment 3 is obtained by replacing the electron emitting elements 1 of FIGS. 10 and 11 by the electron emitting element 2001 as shown in FIG. 13, respectively.

The air blowing device 150 illustrated in FIG. 10 includes the electron emitting device 10 including the electron emitting element 1 and a power supply 7 for applying a voltage to the electron emitting element 1. In the air blowing device 150, the electron emitting element 1 emits electrons toward an object 41 to be cooled so that ion wind is generated and the object 41 electrically grounded is cooled. In cases where the object 41 is cooled, it is preferable that a voltage of approximately 18 V is applied to the electron emitting element 1 and, at this applied voltage of approximately 18 V, the electron emitting element 1 emits, for example, 1 μA/cm² of electrons per unit of time in the atmosphere.

In addition to the arrangement of the air blowing device 150 illustrated in FIG. 10, an air blowing device 160 illustrated in FIG. 16 further includes a blowing fan 42. In the air blowing device 160 illustrated in FIG. 11, an electron emitting element 1 emits electrons toward an object 41 to be cooled and the blowing fan 42 blows the electrons toward the object 41 so that the object 41 electrically grounded is cooled down by generation of ion wind. In this case, it is preferable that an air volume generated by the blowing fan 42 is in a range of 0.9 L to 2 L per minute per square centimeter.

Now, a case where the object 41 is to be cooled by blowing air is considered. In a case where the object 41 is cooled by blowing only the atmospheric air with use of a fan or the like as in a conventional air blowing device or a conventional cooling device, cooling efficiency is low because a flow rate on a surface of the object 41 becomes 0 and the air in a section from which heat should be dissipated the most is not replaced. However, in cases where electrically charged particles such as electrons or ions are included in the air sent to the object 41, the air sent to the object 41 is attracted to the surface of the object 41 by electric force in the vicinity of the object 41. This makes it possible to replace the air in the vicinity of the surface of the object 41. In the present embodiment, because the air blowing devices 150 and 160 of the present invention blow air including electrically charged particles such as electrons or ions, the cooling efficiency is significantly improved.

Note that, employing the electron emitting device 10 or the electron emitting device 1010, the air blowing devices 150 and 160 can work in the atmosphere. Further, employing the electron emitting device 2010, the air blowing devices 150 and 160 can more efficiently carry out the cooling due to a high electron emission efficiency of the electron emitting device 2010.

[Configurations of Present Invention]

As described above, an electron emitting element of the present invention includes: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including a binder component in which an insulating material and conductive fine particles are dispersed.

In the electron emitting element of the present invention includes, as described above: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode. The electron acceleration layer includes a binder component in which conductive fine particles and an insulating fine particles are dispersed. The insulating fine particles have an average particle diameter greater than an average particle diameter of the conductive fine particles, and, in the electron acceleration layer, the conductive fine particles are dispersed in large numbers on a side of the thin-film electrode.

According to the arrangement, there is provided the electron acceleration layer between the electrode substrate and the thin-film electrode. The electron acceleration layer includes a binder component in which the insulating fine particles and the conductive fine particles are dispersed. This electron acceleration layer is a thin-film layer in which the insulating fine particles and the conductive fine particles are dispersed in the binder component, and has a semiconductive property. When a voltage is applied to the semiconductive electron acceleration layer, current flow occurs in the electron acceleration layer. A part of electrons in the current become ballistic electrons due to an intense electric field produced by the applied voltage and the ballistic electrons are emitted.

In the electron acceleration layer, because many conductive fine particles are dispersed on a side of the thin-film electrode, an electric field becomes more intense in the vicinity of the thin-film electrode, and electron emission efficiency becomes high. Moreover, the conductive fine particles are dispersed in the binder component, that is, the binder component is present around the conductive fine particles. This makes element degradation due to oxidation caused by oxygen in the atmosphere difficult to occur. Therefore, the electron emitting element can be steadily operated not only in vacuum but also under the atmospheric pressure. Further, because the insulating fine particles and the conductive fine particles are dispersed in the binder component, aggregation of the fine particles is difficult to occur. Accordingly, performance of the electron emitting element becomes uniform, and steady electron supply becomes possible. Furthermore, the binder component has a high adhesiveness with respect to the electrode substrate and a high mechanical strength. In addition, the binder component improves smoothness of a surface of the electron acceleration layer, so that the thin-film electrode on the electron acceleration layer can be formed thinly.

In this way, according to the above arrangement, electrons can be emitted at a high efficiency. Further, because degradation of the electron acceleration layer can be prevented, electrons can be efficiently and steadily emitted not only in vacuum but also under the atmospheric pressure. In addition, a mechanical strength can be improved.

In the electron emitting element of the present invention: the conductive fine particles may be made of a conductor having a high resistance to oxidation. To have a high resistance to oxidation here means to have a small oxide formation reaction. In general, according to a thermodynamic calculation, when a value of a change ΔG [kJ/mol] in free energy of oxide formation is negative and greater, the oxide formation reaction occurs more easily. In the present invention, a metal element whose ΔG is equal to or greater than −450 [kJ/mol] is considered to be the conductive fine particles having a high resistance to oxidation. Further, the conductive fine particles having a high resistance to oxidation also include conductive fine particles whose oxide formation reaction is made difficult to occur by attaching, on the conductive fine particles, an insulating material whose average particle diameter is smaller than that of the conductive fine particles or by coating the conductive fine particles with use of such an insulating material.

According to the arrangement, because a conductor having a high resistance to oxidation is used as the conductive fine particles, element degradation due to oxidation caused by oxygen in the atmosphere becomes hard to occur. Therefore, the electron emitting element can be more steadily operated even under the atmospheric pressure. Therefore, a life of the electron emitting element can be extended and the electron emitting element can be operated continuously for a long time even in the atmosphere.

In the electron emitting element of the present invention, the conductive fine particles are made of a noble metal. Because the conductive fine particles are made of a noble metal as described above, it becomes possible to prevent element degradation such as oxidation caused by oxygen in the atmosphere. This makes it possible to extend a life of the electron emitting element.

In the electron emitting element of the present invention, the conductor that the conductive fine particles are made of may contain at least one of gold, silver, platinum, palladium, and nickel. Because the conductor that the conductive fine particles are made of contains at least one of gold, silver, platinum, palladium, and nickel, it becomes possible to more effectively prevent element degradation such as oxidation of the conductive fine particles caused by oxygen in the atmosphere. This makes it possible to extend a life of the electron emitting element.

In the electron emitting element of the present invention, because control of electric conductivity is required, an average particle diameter of the conductive fine particles should be smaller than that of the insulating fine particles, and preferably in a range of 3 nm to 10 nm. Alternatively, the average particle diameter of the conductive fine particles is preferably in a range of 3 nm to 10 nm.

In a case where, in the way as described above, an average particle diameter of the conductive fine particles is arranged to be smaller than that of the insulating fine particles and preferably in a range of 3 nm to 10 nm, or, simply, the average particle diameter of the conductive fine particles is arranged in a range of 3 nm to 10 nm, the following effect is obtained.

That is, a conductive path is not formed in the electron acceleration layer by the conductive fine particles. As a result, dielectric breakdown becomes difficult to occur in the electron acceleration layer. There are a lot of unexplained points in terms of a principle. However, the ballistic electrons are efficiently generated by use of the conductive fine particles whose average particle diameter is within the above range.

In the electron emitting element of the present invention, the insulating material or the insulating fine particles may contain an organic polymer or at least one of $SiO_2$, $Al_2O_3$, and $TiO_2$. By arranging the insulating material or the insulating fine particles to contain an organic polymer or at least one of $SiO_2$, $Al_2O_3$, and $TiO_2$, it becomes possible to adjust a resistance value in any range due to a high insulating property of the above substances. In particular, in a case where oxide (of $SiO_2$, $Al_2O_3$, and $TiO_2$) is used as the insulating material or the insulating fine particles and a conductor having a high resistance to oxidation is used as the conductive fine particles, element degradation due to oxidation caused by oxygen in the atmosphere is made more difficult to occur. Therefore, the effect of steadily operating the electron emitting element under the atmospheric pressure can be obtained more significantly.

In the electron emitting element of the present invention, in a case where the insulating material is made of fine particles, an average particle diameter of the fine particles is preferably in a range of 10 nm to 1000 nm, and more preferably in a range of 12 nm to 110 nm.

By arranging the average particle diameter of the insulating material made of the fine particles to be preferably in a range of 10 nm to 1000 nm and more preferably in a range of 12 nm to 110 nm, it is possible to efficiently dissipate Joule heat that occurs at the time when current flows inside the element. This dissipation of Joule heat is carried out by efficiently conducting heat from the inside of the conductive fine particles to the outside of the conductive fine particles that are smaller in size than the insulating fine particles. This can prevent the electron emitting element from being broken down by heat. This also makes it possible to easily control a resistance value of the electron acceleration layer.

In the electron emitting element of the present invention, the average particle diameter of the insulating fine particles is preferably in a range of 10 nm to 200 nm.

By arranging the average particle diameter of the insulating fine particles preferably in a range of 10 nm to 200 nm, it is possible to efficiently dissipate Joule heat that occurs at the time when current flows inside the element. This dissipation of Joule heat is carried out by efficiently conducting heat from the inside of the conductive fine particles to the outside of the conductive fine particles that have an average particle diameter smaller than that of the insulating fine particles. This makes it possible to prevent the electron emitting element from being broken down by heat. Further, this also makes it possible to easily control a resistance value of the electron acceleration layer.

When the electron acceleration layer is to be formed by applying the conductive fine particles on a layer of the binder component including the insulating fine particles, most of the conductive fine particles that are applied and have an average particle diameter of 3 nm to 10 nm do not permeate inside the layer of the binder component including the insulating fine particles but are accumulated on the layer in a case where the insulating fine particles have an average particle diameter of less than 10 nm. As a result, the electron emitting element cannot provide an advantageous effect as an electron emitting element. Meanwhile, in a case where the insulating fine particles have an average particle diameter of more than 200 nm, most of the conductive fine particles that are applied and have an average particle diameter in a range of 3 nm to 10 nm do not stay on the layer of the binder component including the insulating fine particles. Therefore, in a case where the conductive fine particles having the average particle diameter of 3 nm to 10 nm are used, the average particle diameter of the insulating fine particles is preferably in a range of 10 nm to 200 nm.

The insulating fine particles preferably has an average particle diameter greater than an average particle diameter of the conductive fine particles and the average particle diameter of the insulating fine particles is preferably in a range of 10 nm to 500 nm.

Because the average particle diameter of the insulating fine particles is arranged to be larger than the average particle diameter of the conductive fine particles, it is possible to efficiently dissipate Joule heat that occurs at the time when current flows inside the element. This dissipation of Joule heat is carried out by efficiently conducting heat from the inside of the conductive fine particles to the outside of the conductive fine particles that have an average particle diameter smaller than that of the insulating fine particles. This makes it possible to prevent the electron emitting element from being broken down by heat. Further, this also makes it possible to easily control a resistance value of the electron acceleration layer.

A degree of permeation of the conductive fine particles into the fine particle layer depends on, for example, a kind and/or an average particle diameter of the insulating fine particles, a kind and/or an average particle diameter of the conductive fine particles, and/or a combination of the insulating fine particles and the conductive fine particles. In other words, in a case where the average particle diameter of the insulating fine particles is small, most of the conductive fine particles that are applied do not permeate inside a layer of the insulating fine particles but are accumulated on the layer. Meanwhile, in a case where the average particle diameter of the insulating fine particles is large, a gap between particles in the fine particle layer becomes so large that an amount of the conductive fine particles staying in the fine particle layer becomes small. Therefore, for controlling the degree of permeation of the conductive fine particles into the fine particle layer in a case where the conductive fine particles having an average particle diameter of 3 nm to 10 nm are used, the average particle diameter of the insulating fine particles is preferably in a range of 10 nm to 500 nm.

In a case where the electron acceleration layer includes the binder component, most of the conductive fine particles that have the average particle diameter of 3 nm to 10 nm and are applied do not stay on a layer of the binder component including the insulating fine particles if the average particle diameter of the insulating fine particles is larger than 200 nm. Therefore, in a case where the electron acceleration layer includes the binder component and employs the conductive fine particles having the average particle diameter of 3 nm to 10 nm, the average particle diameter of the insulating fine particles is preferably in a range of 10 nm to 200 nm.

Note that in either cases described above, distribution of the particle diameters of the respective insulating fine particles may be broad with respect to the average particle diameter. For example, respective particle diameters of the fine particles having an average particle diameter of 50 nm may be distributed in a range of 20 nm to 100 nm.

In the electron emitting element of the present invention, a ratio of the conductive fine particles in the electron acceleration layer is preferably in a range of 0.5% by weight to 30% by weight. In a case where the ratio by weight is smaller than 0.5%, the electron emitting element does not provide an effect of increasing current in element. In a case where the ratio by weight is greater than 30%, aggregation of the conductive fine particles occurs. In particular, a ratio of the conductive fine particles in the electron acceleration layer is more preferably in a range of 1% by weight to 10% by weight.

In the electron emitting element of the present invention, a layer thickness of the electron acceleration layer is preferably in a range of 12 nm to 6000 nm and more preferably in a range of 300 nm to 6000 nm. By arranging the layer thickness of the electron emitting layer to be preferably in the range of 12 nm to 6000 nm and more preferably in the range of 300 nm to 6000 nm, it becomes possible to make the layer thickness of the electron acceleration layer even. It also becomes possible to control a resistance of the electron acceleration layer in a layer thickness direction. As a result, electrons can be emitted from all over a surface of the electron emitting element uniformly. Further, the electrons can be emitted efficiently to the outside of the element.

In the electron emitting element of the present invention, a layer thickness of the electron acceleration layer is in a range of 10 nm to 6000 nm, and more preferably in a range of 300 nm to 6000 nm. By arranging the layer thickness of the electron emitting layer to be preferably in the range of 10 nm to 6000 nm and more preferably in the range of 300 nm to 6000 nm, it becomes possible to make the layer thickness of the electron acceleration layer even. It also becomes possible to control a resistance of the electron acceleration layer in a layer thickness direction. As a result, electrons can be emitted from all over a surface of the electron emitting element uniformly. Further, the electrons can be emitted efficiently to the outside of the element.

In the electron emitting element of the present invention, the thin-film electrode may contain at least one of gold, silver, carbon, tungsten, titanium, aluminum, and palladium. Because the thin-film electrode contains at least one of gold, silver, carbon, tungsten, titanium, aluminum, and palladium, tunneling of electrons generated by the electron acceleration layer becomes more efficient because of a low work function of the above substances. As a result, it becomes possible to emit more electrons having high energy to the outside of the electron emitting element.

In the electron emitting element of the present invention, a small insulating material may be present around the conductive fine particles, the small insulating material being made of insulating fine particles that are smaller than the conductive fine particles. The presence of the small insulating material around the conductive fine particles contributes to improvement of dispersibility of the conductive fine particles in a dispersion solution at the time when the element is produced. In addition, due to the presence, element degradation such as oxidation of the conductive fine particles caused by oxygen in the atmosphere can be more effectively prevented. This makes it possible to effectively extend a life of the electron emitting element.

In the electron emitting element of the present invention, the small insulating material may contain at least one of alcoholate, aliphatic acid, and alkanethiol. It contributes to improvement of dispersibility of the conductive fine particles at the time when the element is produced that the small insulating material contains at least one of alcoholate, aliphatic acid, and alkanethiol as described above. As a result, abnormal current path formation caused by an aggregate of the electrically conductive fine particles becomes difficult to occur. In addition, because the above case prevents a change in composition of particles due to oxidation of the electrically conductive fine particles themselves that are present around the insulating material, no influence on electron emission characteristics occurs. Therefore, a life of the electron emitting element can be effectively extended.

In the electron emitting element of the present invention, the small insulating material is present as an adhering substance and adheres to respective surfaces of the electrically conductive fine particles. This adhering substance may coat respective surfaces of the electrically conductive fine particles, as an aggregate of the particles each having a smaller average particle diameter than the average particle diameter of the electrically conductive fine particles. In this way, the small insulating material adheres to the respective surfaces of the electrically conductive fine particles or coats, as an aggregate of the particles each having an average particle diameter smaller than the average particle diameter of the conductive fine particles, the respective surfaces of the electrically conductive fine particles. This presence of the small insulating material contributes to improvement in dispersibility of the electrically conductive fine particles in the dispersion solution at the time when the element is produced. Accordingly, abnormal current path formation caused by an aggregate of the electrically conductive fine particles becomes difficult to occur. In addition, because the above case prevents a change in composition of particles due to oxidation of the conductive fine particles themselves that are present around the insulating material, no influence on electron emission characteristics occurs. Therefore, a life of the electron emitting element can be more effectively extended.

An electron emitting device of the present invention includes: any one of the electron emitting elements described above; and a power supply section for applying a voltage between the electrode substrate and the thin-film electrode.

According to the arrangement, electric conductivity is ensured so that sufficient current flows in the element and ballistic electrons can be efficiently and steadily emitted from the thin-film electrode.

Further, according to the arrangement, the electron emitting device can be produced easily at low cost. This electron emitting device is capable of steadily and sufficiently emitting electrons.

By using the electron emitting element of the present invention in a light emitting device and an image display device including the light emitting device, it becomes possible to provide a light emitting device that steadily perform planar light emission and has a long life.

By using the electron emitting element of the present invention in a light emitting device and an image display device including the light emitting device, electron emission efficiency in the light emitting device and the image display device improves. As a result, light can be emitted at a high efficiency.

By using the electron emitting device of the present invention in a light emitting device and an image display device including the light emitting device, electrons can be steadily and sufficiently emitted in the light emitting device and the image display device. Therefore, light can be emitted at a high efficiency.

By using the electron emitting element of the present invention in an air blowing device or a cooling device, cooling at a high efficiency becomes possible as a result of utilization of a slip effect on a surface of an object to be cooled. Further, in the cooling, no electric discharge occurs and no harmful substances such as ozone and $NO_x$ are produced.

By using the electron emitting element of the present invention in an air blowing device or a cooling device, electron emission efficiency of the air blowing device or the cooling device is improved. Accordingly, cooling at a high efficiency becomes possible.

By using the electron emitting device of the present invention in an air blowing device or a cooling device, electrons can be steadily and sufficiently emitted from the air blowing device or the cooling device. Accordingly, steady and desirable cooling becomes possible.

By using the electron emitting element of the present invention in a charging device and an image forming apparatus including the charging device, an object to be charged can be steadily charged for a long time while no electric discharge occurs and no harmful substances such as ozone and $NO_x$ are produced.

By using the electron emitting element of the present invention in a charging device and an image forming apparatus including the charging device, electron emission efficiency in the charging device and the image forming apparatus is improved. Accordingly, charging at a high efficiency becomes possible.

By using the electron emitting device of the present invention in a charging device and an image forming apparatus including the charging device, electrons can be emitted at a high efficiency in the charging device and the image forming apparatus. Accordingly, charging at a high efficacy becomes possible.

By using an electron emitting element of the present invention in an electron-beam curing device, it becomes possible to perform electron-beam curing area by area. This makes it possible to allow a maskless process, thereby achieving low cost and high throughput.

The use of the electron emitting element of the present invention in an electron-beam curing device also makes it possible to improve electron emission efficiency of the electron-beam curing device. Therefore, irradiation of an electron beam at a high efficiency becomes possible.

Further, by using the electron emitting element of the present invention in an electron-beam curing device, steady and desirable electron emission from the electron-beam curing device becomes possible. Therefore, highly stable and desirable irradiation of an electron beam becomes possible.

As described above, a method of the present invention for producing an electron emitting element that includes: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the method includes the steps of: preparing a dispersion solution in which an insulating material is dispersed in a binder component; preparing a mixture solution in which conductive fine particles are dispersed in the dispersion solution; and forming the electron acceleration layer by applying the mixture solution on the electrode substrate.

According to the method, the electron acceleration layer is formed by applying, on the electrode substrate, the mixture solution in which the insulating material and the conductive fine particles are dispersed in the binder component. As a result, by coating the electrode substrate thinly and evenly with use of the insulating material and the conductive fine particles, it becomes possible to provide an element that has a uniform performance, that is capable of efficiently and steadily emitting electrons, and that has a high mechanical strength.

As described above, a method of the present invention for producing an electron emitting element that includes: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the method includes the step of forming the electron acceleration layer, the step including the sub-steps of: forming, on the electrode substrate, a binder component layer by applying a dispersion solution of a binder component in which dispersion solution insulating fine particles are dispersed; and applying, on the binder component layer, a conductive fine particle dispersion solution in which conductive fine particles having a smaller average particle diameter than an average particle diameter of the insulating fine particles are dispersed in a solvent.

According to the method, the electron acceleration layer is formed by applying, on the binder component layer in which the insulating fine particles are dispersed, a dispersion solution in which the conductive fine particles whose average particle diameter is smaller than an average particle diameter of the insulating fine particles are dispersed in a solvent. Then, the conductive fine particles applied on the binder component layer permeate inside the binder component including the insulating fine particles. Therefore, the electron acceleration layer is arranged such that: the insulating fine particles and the conductive fine particles are dispersed in the binder component and the conductive fine particles are dispersed in large numbers on a side of the thin-film electrode.

Therefore, according to the above method, the electrons can be emitted at a high efficiency and degradation of the electron acceleration layer can be prevented. As a result, it becomes possible to produce an element that can efficiently and steadily emit electrons not only in vacuum but also under the atmospheric pressure and that has a high mechanical strength.

According to the method of the present invention for producing the electron emitting element, in the step of applying the conductive fine particle dispersion solution, the conductive fine particle dispersion solution may be applied by a spin coating method.

By using the spin coating method, the conductive fine particles can be applied very easily to a wide area above the insulating fine particles that are dispersed in the binder component. Therefore, the spin coating method can be suitably used for a device that is required to emit electrons in a wide area. Further, any kind of conductive fine particles can be applied by the spin coating method.

In the method of the present invention for producing the electron emitting element, in the step of applying the conductive fine particle dispersion solution, the conductive fine particle dispersion solution may be applied by a spraying method.

By using the spraying method, the conductive fine particles can be discharged in very tiny droplets. As a result, the conductive fine particles can be applied thinly and evenly above the insulating fine particles dispersed in the binder component. Examples of the spraying method are an ultrasonic spray method, a spray method, and an electrostatic spray method. In consideration of the advantageous points such that splash of spray droplets can be prevented and that a diameter of sprayed droplets can be easily controlled to be small, the electrostatic spray method is particularly preferable.

In the method of the present invention for producing the electron emitting element, in the step of applying the conductive fine particle dispersion solution, the conductive fine particle dispersion solution may be applied by an ink-jet method.

In a case where the ink-jet method is used, it becomes possible to control a density at which the conductive fine particles are applied and a position in which the conductive fine particles are applied on the insulating fine particles dispersed in the binder component. Therefore, the ink-jet method is suitably used for a device that requires patterning, a switching element and the like.

As described above, a method of the present invention for producing an electron emitting element that includes: an electrode substrate; a thin-film electrode; and an electron acceleration layer including conductive fine particles and insulating fine particles, the electron acceleration layer being sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the method includes the step of forming the electron acceleration layer, the step including the sub-steps of: forming, on the electrode substrate, a fine particle layer by applying an insulating fine particle dispersion solution in which the insulating fine particles are dispersed in a dispersion solvent, the fine particle layer including the insulating fine particles; and applying, on the fine particle layer, a conductive fine particle dispersion solution by an ink-jet method, in which conductive fine particle dispersion solution the conductive fine particles are dispersed in a dispersion solvent.

In the method of the present invention for producing the electron emitting element, the dispersion solvent of the insulating fine particle dispersion solution may be different from the dispersion solvent of the conductive fine particle dispersion solution.

In a case where a dispersion solvent in which the insulating fine particles are easily dissolved is different from a dispersion solvent in which the conductive fine particles are easily dissolved, the following problem occurs. That is, in a case where the insulating fine particle dispersion solution and the conductive fine particle dispersion solution include different dispersion solvents, an aggregate of the fine particles tends to be produced at the time when the fine particles are mixed. If, only one dispersion solvent that has a high dispersibility for either one of the insulating fine particles and the conductive fine particles is used for both the insulating fine particles and the conductive fine particles for preventing the production of the aggregate at the time when the fine particles are mixed, dispersibility for the other one of the fine particles becomes low and an aggregate is produced. Therefore, to use one solvent for both the insulating fine particles and the conductive fine particles does not provide a solution to the problem of the occurrence of the aggregate.

However, according to the above method of the present invention, the dispersion solutions of the insulating fine particles and the conductive fine particles are not mixed. The conductive fine particle dispersion solution is applied after the fine particle layer including the insulating fine particles is formed by applying the insulating fine particle dispersion solution. Accordingly, even when the dispersion solvent in which the insulating fine particles are easily dispersed is different from the dispersion solvent in which the conductive fine particles are easily dispersed, the electron acceleration layer can be formed while dispersibility of each of the insulating fine particles and the conductive fine particles is kept. In other words, even when the dispersion solvent in which the insulating fine particles are highly dispersible is different from the dispersion solvent in which the conductive fine particles are highly dispersible, it is possible to form a uniform electron acceleration layer that does not include an aggregate of the insulating fine particles, an aggregate of the conductive fine particles, and an aggregate of the insulating fine particles and the conductive fine particles.

In the method of the present invention for producing the electron emitting element, the insulating fine particle dispersion solution may contain a binder component.

A dispersion state of the insulating fine particles is maintained in the fine particle layer including the binder component and the insulating fine particles. Accordingly, even when the ink-jet method is used for applying the conductive fine particle dispersion solution, the dispersion state of the insulating fine particles in the fine particle layer does not change. This makes it possible to form the electron acceleration layer in which the electron emitting section is controlled to be more evenly provided and thereby to produce the electron emitting element capable of steadily and sufficiently emitting electrons. Further, the binder component has a high adhesiveness with respect to the electrode substrate and can improve mechanical strength of the element.

In the method of the present invention for producing the electron emitting element, the conductive fine particle dispersion solution may be a nano-colloid solution of the conductive fine particles.

According to the above method, a nano-colloid solution of the conductive fine particles is applied to the fine particle layer including the insulating fine particles. Because the nano-colloid solution of the conductive fine particles used in this case is a liquid nano-colloid solution, the dispersion solution in which the conductive fine particles are not aggregated but uniformly dispersed can be applied. Accordingly, the electron acceleration layer in which the conductive fine particles are provided more evenly is formed on the fine particle layer. As a result, the electron emitting element capable of steadily and sufficiently emitting electrons can be produced.

An electron emitting element of the present invention may be produced by the method of the present invention for producing the electron emitting element.

In the electron emitting element produced according to the method of the present invention for producing the electron emitting element, the electron acceleration layer between the electrode substrate and the thin-film electrode is a layer including the insulating fine particles and the conductive fine particles and has a semiconductive property. When a voltage is applied to the semiconductive electron acceleration layer, current flow occurs in the electron acceleration layer. A part of electrons in the current become ballistic electrons due to an intense electric field produced by the applied voltage and the ballistic electrons are emitted. This electron emitting element can be produced easily at low cost so that a small amount of conductive fine particles are provided evenly. Further, the electron emitting element can steadily and sufficiently emit electrons. By applying the conductive fine particle dispersion solution by the ink-jet method, a position (discharge position) of the conductive fine particles can be controlled. Accordingly, patterning of the electron emitting section becomes possible. Therefore, the electron emitting element is suitable for application in an image display device such as a flat panel display.

Furthermore, the electron emitting element of the present invention may have the following arrangement. That is, as described above, an electron emitting element of the present invention includes: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer being made of a fine particle layer including insulating fine particles, the fine particle layer having a surface at least on which conductive fine particles are discretely provided.

According to the above arrangement, the electron acceleration layer includes the fine particle layer including the insulating fine particles, and the conductive fine particles are discretely provided at least on a surface of the fine particle layer. Accordingly, a control of a position of the electron emitting section becomes possible. This makes it possible to prevent a phenomenon in which a constituent material of the thin-film electrode that is formed on the electron acceleration layer is worn out due to electrons emitted. Further, an amount of electrons emitted per unit area and the like can also be controlled.

In the electron emitting element of the present invention, the fine particle layer preferably includes a binder component.

The element in which the conductive fine particles are discretely provided at least on the surface of the fine particle layer is produced by, for example, applying the conductive fine particle dispersion solution by the ink-jet method or the like after formation of the fine particle layer. However, in this case, because a dispersion state of the insulating fine particles is kept in the fine particle layer including the binder component, the dispersion state of the insulating fine particles in the fine particle layer does not change even if the conductive fine particle dispersion solution is subsequently applied. This results in formation of the electron acceleration layer that has improved controllability of an electron emitting position. As a result, it becomes possible to produce an electron emitting element capable of steadily and sufficiently emitting electrons.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can be suitably applied, for example, (i) to a charging device of image forming apparatuses such as an electrophotographic copying machine, a printer, and a facsimile; (ii) an electron-beam curing device; (iii) in combination with a luminous body, to an image display device; or (iv) by utilizing ion wind generated by electrons emitted from the electron emitting element, to a cooling device.

REFERENCE SIGNS LIST

1 Electron emitting element
2 Electrode substrate
3 Thin-Film Electrode
4 Electron acceleration layer
5 Insulating fine particles
  (Insulating material)
6 Conductive fine particles
7 Power supply (Power supply section)
8 Counter Electrode
9 Insulating spacer
10 Electron emitting device
11 Photoreceptor
15 Binder Component
21 Acceleration Electrode
22 Resist (Object to be cured)
31, 31', 31" Light emitting device
32, 32' Luminous body (Light emitting body)
33 ITO film
34 Glass substrate
35 Power Supply 36 Light emitting section
41 Object to be cooled
42 Air blowing fan
90 Charging device
100 Electron-beam curing device
140 Image display device
150 Air blowing device
160 Air blowing device
330 Liquid crystal panel

The invention claimed is:

1. A method for producing an electron emitting element that includes:
   an electrode substrate;
   a thin-film electrode; and
   an electron acceleration layer sandwiched between the electrode substrate and the thin-film electrode,
   the electron emitting element (i) accelerating electrons in the electron acceleration layer at a time when a voltage is applied between the electrode substrate and the thin-film electrode and (ii) emitting the electrons from the thin-film electrode,
   the method comprising the steps of:
   preparing a dispersion solution in which an insulating material is dispersed in a binder component;
   preparing a mixture solution in which conductive fine particles are dispersed in the dispersion solution; and
   forming the electron acceleration layer by applying the mixture solution on the electrode substrate.

2. A method for producing an electron emitting element that includes:
   an electrode substrate;
   a thin-film electrode; and
   an electron acceleration layer sandwiched between the electrode substrate and the thin-film electrode,
   the electron emitting element (i) accelerating electrons in the electron acceleration layer at a time when a voltage is applied between the electrode substrate and the thin-film electrode and (ii) emitting the electrons from the thin-film electrode,
   the method comprising the step of forming the electron acceleration layer,
   the step including the sub-steps of:
   forming, on the electrode substrate, a binder component layer by applying a dispersion solution of a binder component in which dispersion solution insulating fine particles are dispersed; and
   applying, on the binder component layer, a conductive fine particle dispersion solution in which conductive fine particles having a smaller average particle diameter than an average particle diameter of the insulating fine particles are dispersed in a solvent.

3. The method as set forth in claim 2 for producing the electron emitting element, wherein:
   in the step of applying the conductive fine particle dispersion solution, the conductive fine particle dispersion solution is applied by a spin coating method.

4. The method as set forth in claim 2 for producing the electron emitting element, wherein:
   in the step of applying the conductive fine particle dispersion solution, the conductive fine particle dispersion solution is applied by a spraying method.

5. A method for producing an electron emitting element that includes:
   an electrode substrate;
   a thin-film electrode; and
   an electron acceleration layer including conductive fine particles and insulating fine particles, the electron acceleration layer being sandwiched between the electrode substrate and the thin-film electrode,
   the electron emitting element (i) accelerating electrons in the electron acceleration layer at a time when a voltage is applied between the electrode substrate and the thin-film electrode and (ii) emitting the electrons from the thin-film electrode, the method comprising the step of forming the electron acceleration layer,
   the step including the sub-steps of:
   forming, on the electrode substrate, a fine particle layer by applying an insulating fine particle dispersion solution in which the insulating fine particles are dispersed in a dispersion solvent, the fine particle layer including the insulating fine particles; and
   applying, on the fine particle layer, a conductive fine particle dispersion solution by an ink jet method, in which conductive fine particle dispersion solution the conductive fine particles are dispersed in a dispersion solvent.

6. The method as set forth in claim 5 for producing the electron emitting element, wherein:
   the insulating fine particle dispersion solution contains a binder component.

7. An electron emitting element produced by the method as set forth in claim 5 for producing the electron emitting element.

* * * * *